United States Patent [19]

Shinohara

[11] Patent Number: 5,523,908
[45] Date of Patent: Jun. 4, 1996

[54] CASSETTE TAPE PLAYER HAVING CASSETTE GUIDE

[75] Inventor: Isao Shinohara, Ikoma, Japan

[73] Assignee: Matsushita Electric Industrial Co., Ltd., Osaka-fu, Japan

[21] Appl. No.: 257,665

[22] Filed: Jun. 8, 1994

[30] Foreign Application Priority Data

Jun. 8, 1993 [JP] Japan .................................. 5-137352

[51] Int. Cl.⁶ ........................... G11B 5/008; G11B 17/04
[52] U.S. Cl. ........................................ 360/96.6; 360/96.5
[58] Field of Search ................................ 360/96.6, 96.5, 360/94, 99.6

[56] References Cited

U.S. PATENT DOCUMENTS

| 5,153,867 | 10/1992 | Inoue ..................................... 360/99.06 |
| 5,172,284 | 12/1992 | Ohshima .............................. 360/96.06 |
| 5,175,656 | 12/1992 | Nakatsukasa et al. ............... 360/96.06 |

FOREIGN PATENT DOCUMENTS

| 603439A1 | 6/1994 | European Pat. Off. |
| 242116A | 1/1987 | Germany . |
| 4-263185 | 9/1992 | Japan . |
| 5-62311 | 3/1993 | Japan . |

Primary Examiner—John H. Wolff
Assistant Examiner—Adriana Giordana
Attorney, Agent, or Firm—Wenderoth, Lind & Ponack

[57] ABSTRACT

A cassette tape player has a cassette chamber defined therein adapted to be selectively opened and closed by a hingedly supported lid which is movable between open and closed positions. This cassette tape player includes a cassette holder movable between loading and operative positions about a holder hinge axis parallel to a lid hinge axis about which the lid pivots. The cassette holder includes a generally elongated holder base and holder arms rigidly connected at one end to respective opposite ends of the holder base so as to define a cassette receiving chamber. A cassette guide is movably secured to a portion of the lid opposite to the lid hinge axis for pivotal movement between retracted and protruding positions about a guide hinge axis parallel to the holder hinge axis and operable to guide a tape cassette into the cassette receiving chamber with opposite side portions of the tape cassette slidingly received by the holder arms when the lid is in the open position. The cassette guide includes guide arms which are spaced from each other a distance corresponding to a space between the holder arms and which, when the lid is in the open position and the cassette guide is biased to the protruding position, form respective guide slopes generally continued to the cassette receiving chamber.

22 Claims, 9 Drawing Sheets

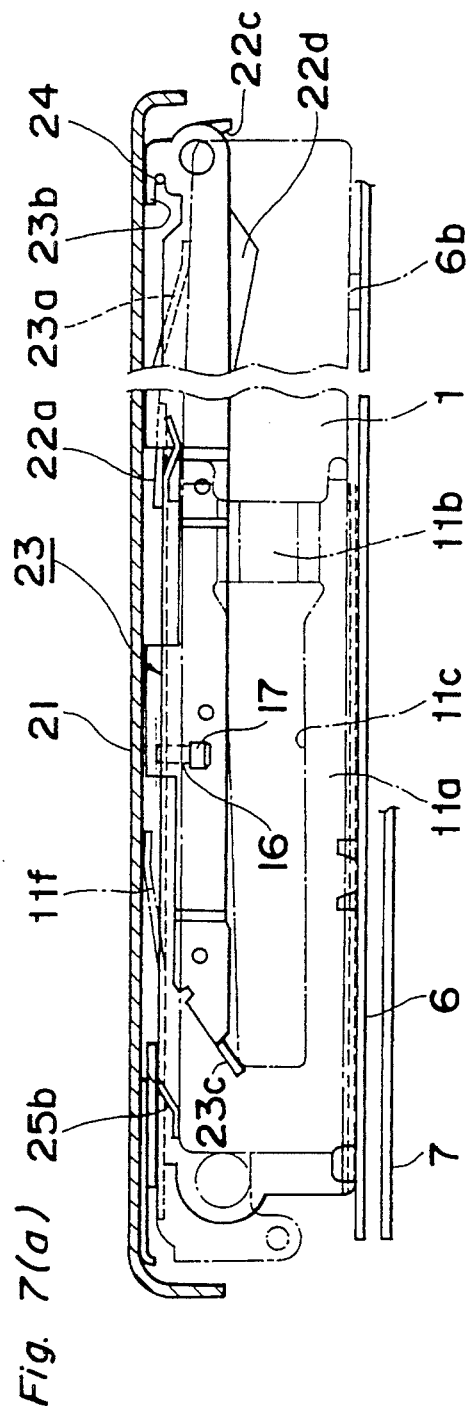
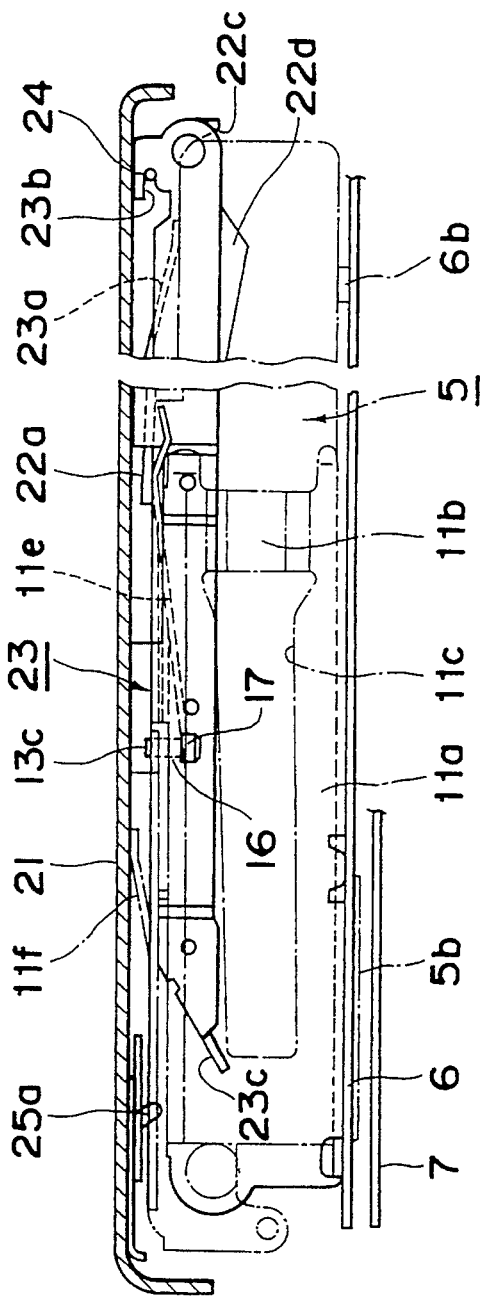
Fig. 7(a)
Fig. 7(b)

CASSETTE TAPE PLAYER HAVING CASSETTE GUIDE

BACKGROUND OF THE INVENTION

1. Field of the Invention

The present invention generally relates to a magnetic tape recording and/reproducing apparatus and, more particularly, to a cassette tape player of a type, though not exclusively limited thereto, which can accommodate either one of two different tape cassettes.

2. Description of the Prior Art

Cassette tape players are being manufactured compact in size and this is particularly true of ergonomic appliances. Cassette tape players of a type employing a cassette loading mechanism comprising a generally U-shaped cassette holder have long been well known in the art. Examples of the cassette loading mechanism hitherto employed are disclosed in, for example, the Japanese Laid-open Patent Publication No. 5-62311, published Mar. 12, 1993, (corresponding to U.S. patent application Ser. No. 07/936,592, filed Aug. 27, 1992, and EP Published Patent Application No. 530700-A2, published Mar. 10, 1993) and U.S. Pat. No. 5,172,284, issued Dec. 15, 1992.

However, with the advent of digitalization of acoustic systems, a relatively recent product in the field of cassette tape recording and/or reproducing apparatuses is a high-fidelity digital audio tape player. The digital audio tape player currently placed in the market is available in two types, namely, R-DAT (rotary head digital audio tape) recorders and S-DAT (stationary head digital audio tape) recorders, according to the different system protocols.

The R-DAT player makes use of a magnetic recording and/or reproducing head supported for rotation relative to a length of magnetic recording tape that is moved slantwise relative to the plane of rotation of the magnetic recording and/or reproducing head. In contrast thereto, the S-DAT player makes use of a magnetic recording and/or reproducing head supported stationary relative to a length of a magnetic recording tape that is moved relative to the magnetic recording and/or reproducing head. So far as a tape cassette is concerned, the both have no compatibility due to difference in sound recording format.

However, due to the use of the stationary head, the S-DAT player has a compatibility with the long-lasting, popular analog audio tape player in the sense that the S-DAT player can accommodate not only a digital compact cassette (DCC) designed specifically for use with the S-DAT player, but also an analog compact cassette (ACC) designed specifically for use with the analog audio tape player. The digital compact cassette and the analog compact cassette have many structural similarities with slight difference in dimension as will subsequently be discussed and, therefore, a cassette tape player having a capability of recording and/or reproducing not only a digital signal but also an analog signal is currently expected.

The currently suggested cassette tape player having the duel capability of recording and/or reproducing either one of the digital and analog signals can make use of either one of the analog compact cassette and the digital compact cassette, both being currently available in the market. The details of each of the analog compact cassette and the digital compact cassette will now be discussed with particular reference to FIGS. 9(a) to 9(c).

The analog compact cassette is shown by 5 in FIG. 9(a) in a front elevational view and comprises a generally rectangular box-like casing 5a having a width L1, a minimum thickness D1, a maximum thickness D2 greater than the minimum thickness D1 and a depth. The width L1 is defined as measured in a direction parallel to a reel-to-reel direction; both of the minimum and maximum thicknesses D1 and D2 are defined as measured in a direction parallel to an axis of rotation of the reels and conforming to the widthwise direction of a length of magnetic recording tape; and the depth is defined as measured in a direction perpendicular to the reel-to-reel direction and also to the axis of rotation of the reels.

The casing 5a referred to above includes rectangular top and bottom panels and a peripheral wall disposed between the top and bottom panels to keep them spaced apart a distance to define a tape chamber, all assembled together to render the tape cassette to represent a generally rectangular, generally flattened box-like configuration. The peripheral wall of the casing 5a includes front and rear wall sections, only the front wall section being shown by 5d in FIG. 9(a), and a pair of side wall sections. The front wall section 5d has at least first, second and third access windows 5e, 5f and 5g defined therein, said first access window 5e being adapted to receive a magnetic recording and/or reproducing head while said second and third access windows 5f and 5g are adapted to receive therein a pinch roller and a motor-coupled capstan.

The casing 5a accommodates therein a pair of freely rotatable reels 5c (FIG. 4) to which opposite ends of a length of magnetic recording tape are anchored, respectively, so as to extend from one reel to the other reel via an operative path substantially along the front wall section 5d by way of guide rollers rotatably disposed at respective corner areas adjacent the front wall section 5d.

The casing 5a of the analog compact cassette 5 has left-hand and right-hand guide bars 5h integral with the side wall sections so as to protrude laterally outwardly therefrom a distance indicated by L2 while extending in a direction conforming to the depth of the analog compact cassette 5.

As compared with the digital compact cassette which is indicated by 1 in FIGS. 9(b) and 9(c) and which will subsequently be described, the analog compact cassette 5 is unique in that respective front portions of the top and bottom panels of the casing 5d adjacent the first to third access windows 5e to 5g are raised upwardly and downwardly, as viewed in FIG. 9(a), thereby to define a bulged area 5b of the analog compact cassette 5. The maximum thickness D2 referred to above is represented by this front bulged area 5b.

On the other hand, the digital compact cassette shown by 1 in FIGS. 9(b) and 9(c) similarly comprises a generally rectangular box-like casing having a width L3, a thickness D3 and a depth. As is the case with the analog compact cassette 5 shown in FIG. 9(a), the width L3 is defined as measured in a direction parallel to the reel-to-reel direction, the thickness D3 is defined as measured in a direction parallel to the axis of rotation of the reels and conforming to the widthwise direction of a length of magnetic recording tape; and the depth is defined as measured in a direction perpendicular to the reel-to-reel direction and also to the axis of rotation of the reels.

Again similarly, the casing of the digital compact cassette 1 includes rectangular top and bottom panels and a peripheral wall disposed between the top and bottom panels to keep them spaced apart a distance to define a tape chamber, all assembled together to render the tape cassette to represent a generally rectangular, generally flattened box-like configuration. The peripheral wall of the casing of the digital compact cassette 1 includes front and rear wall sections and a pair of side wall sections. The front wall section has at least first, second and third access windows 1a, 1b and 1c defined therein, said first access window 1a being adapted to receive a magnetic recording and/or reproducing head while said second and third access windows 1b and 1c are adapted to receive therein a pinch roller and a motor-coupled capstan.

The casing of the digital compact cassette 1 has a pair of freely rotatable reels accommodated therein. Opposite ends of a length of magnetic recording tape are anchored the respective reels so as to permit the length of magnetic recording tape to extend from one reel to the other reel via an operative path substantially along the front wall section by way of guide rollers rotatably disposed at respective corner areas adjacent the front wall section.

The digital compact cassette 1 also comprises a protective slide shutter 1d mounted on the casing for movement between open and closed positions in a direction widthwise of the digital compact cassette 1 as shown in FIGS. 9(b) and 9(c), respectively, The protective shutter 1d is of a generally J-shaped cross-section having a base panel held flat against the bottom panel of the casing, a top panel held flat against the top panel of the casing and a shutter panel lying between the bottom and top panels. The shutter panel has first to third openings defined therein which are, when the shutter 1d is in the open position as shown in FIG. 9(c), aligned with the first to third access windows 5e to 5g to allow respective portions of the length of magnetic recording tape to be exposed to the outside of the casing.

Comparing the analog and digital compact cassettes 5 and 1, the both are similar in appearance. Specifically, the width L1 and the depth of the analog compact cassette 5 are equal to the width L3 and the depth of the digital compact cassette 1, respectively, however, the thickness D3 of the digital compact cassette 1 is somewhat greater than the minimum thickness D1 of the analog compact cassette 5.

Accordingly, in order for a cassette tape player to have a dual capability of accommodating either one of the analog compact cassette 5 and the digital compact cassette 1, a cassette holder used in the cassette tape player must be so designed as to accommodate the different thicknesses of the respective compact cassettes 5 and 1 and also as to accommodate the lateral guide bars 5h of the analog compact cassette 5.

In view of the foregoing, in the Japanese Laid-open Patent Publication No. 5-62311, published Mar. 12, 1993, (corresponding to U.S. patent application Ser. No. 07/936,592, filed Aug. 27, 1992, and EP Published Patent Application No. 530700-A2, published Mar. 10, 1993), the inventor of the present invention has previously suggested a cassette tape player employing a cassette holder of a type capable of satisfactorily and smoothly accommodating either one of the digital and analog compact cassettes.

It has however been found that, in the prior art cassette tape player of the kind referred to above, difficult has often been encountered in inserting either one of the digital and analog compact cassette. This is because, while the opening leading to a cassette receiving chamber defined in the cassette loading mechanism or the cassette holder is relatively narrow, some component parts of the cassette tape player such as, for example, a hingedly supported lid for selectively opening and closing the cassette chamber, which are positioned in the vicinity of the cassette loading mechanism, often provide an obstruction to the insertion of the tape cassette into the cassette receiving chamber.

SUMMARY OF THE INVENTION

The present invention is therefore an improvement in and over the cassette tape player of the type disclosed in the Japanese Laid-open Patent Publication No. 5-62311 and is intended to provide a guided, smooth insertion of at least one of the digital and analog compact cassettes available in the market.

To this end, a cassette tape player is provided in accordance with the present invention, which has a cassette chamber defined therein and adapted to be selectively opened and closed by a hingedly supported lid which is movable between open and closed positions. This cassette tape player comprises a cassette holder movable between loading and operative positions about a holder hinge axis lying parallel to the lid hinge axis about which the lid pivots. The cassette holder includes a generally elongated holder base and holder arms connected at one end rigidly to respective opposite ends of the holder base so as to define a cassette receiving chamber. A cassette guide is movably secured to a portion of the lid opposite to the lid hinge axis for pivotal movement between retracted and protruding positions about a guide hinge axis parallel to the holder hinge axis and operable to guide a tape cassette into the cassette receiving chamber with opposite side portions of the tape cassette slidingly received by the holder arms when the lid is in the open position. A resilient force of a biasing means acts on the cassette guide so that the cassette guide is urged normally to the protruding position. This resilient force of the biasing means also act on the tape cassette to retain said tape cassette in position within the cassette chamber. It is to be noted that the cassette guide normally urged to the protruding position can be forcibly moved to the retracted position against the biasing means when the lid is moved to the closed position.

The cassette guide includes guide arms which are spaced from each other a distance corresponding to a space between the holder arms and which, when the lid is in the open position and the cassette guide is biased to the protruding position, form respective guide slopes generally continued to the cassette receiving chamber.

According to the present invention, the cassette guide pivotally supported by the lid facilitate a smooth and reliable insertion of the tape cassette into the cassette receiving chamber defined in the cassette holder. In addition, the biasing means ensures that the tape cassette received in the cassette receiving chamber is urged at all times towards the holder base and, at the same time, towards a base plate of the cassette tape player so as to lie flat against the base plate and, therefore, a reliable sliding contact of the magnetic recording/reproducing head with the length of magnetic recording tape is ensured.

Preferably, the guide arms have respective side walls formed therein and spaced from each other a distance corresponding to a width of the tape cassette for regulating lateral motion of the tape cassette when the tape cassette is inserted into the cassette receiving chamber. This is particularly advantageous in that, while the guide arms themselves serve to guide the tape cassette generally straight into the cassette receiving chamber, the side walls serve to align the tape cassette with the cassette receiving chamber by regulating the lateral displacement of the tape cassette.

Also, the guide arms may have respective transverse walls formed therein so as to extend in a direction parallel to the guide hinge axis and engageable with a rear side edge of the tape cassette with respect to the direction of insertion, received within the cassette receiving chamber, to urge the tape cassette in a direction close towards the holder base when the lid is moved to the closed position with the cassette holder held at the operative position. The provision of the transverse walls is effective to restrict the tape cassette firmly in an operative position for actual information recording or reproduction without allowing the tape cassette to undergo any possible rattling motion within the cassette chamber in a direction away from and close towards the magnetic head. Prevention of the tape cassette from undergoing the rattling motion is more enhanced if the transverse walls are formed with respective inclined ribs which are slidingly engageable with portions of the rear side edge of the tape cassette.

In such case, in a preferred embodiment of the present invention, the biasing means comprises separate spring elements, one used to urge the tape cassette through the holder arms by way of the guide arms and the other used to urge the tape cassette through the transverse walls integral with the guide arms.

The present invention also provides a capability of the cassette tape player to operate with either one of the digital and analog compact cassettes. As discussed hereinbefore, the digital compact cassette is of a type having a uniform thickness and a head access window and at least one roller access window defined at a front thereof and also having a normally closed slide shutter for selectively opening and closing both the head and roller access windows, while the analog compact cassette is of a type having a head access window and at least one roller access window defined at a bulged area at a front thereof and having maximum and minimum thicknesses, the maximum thickness being represented by the bulged area.

In the case of the cassette tape player operable with either one of the digital and analog compact cassettes, the player additionally comprises a first spring means operable only when the analog compact cassette is inserted into the cassette receiving chamber and engageable with the bulged portion of the analog compact cassette, when the cassette holder carrying the tape cassette is moved to the operative position upon closure of the lid, to firmly retain the analog compact cassette in position within the cassette chamber, a second spring means operably only when the digital compact cassette is inserted into the cassette receiving chamber and engageable with the digital compact cassette, when the cassette holder carrying the digital compact cassette is moved to the operative position upon closure of the lid, to firmly retain the digital compact cassette in position within the cassette chamber, and a shutter actuating means operable only when the digital compact cassette is inserted into the cassette receiving chamber and carried by the holder base for movement between erected and retracted positions past a folded position. The shutter actuating means is pivoted to the folded position in response to insertion of the digital compact cassette thereby to open the slide shutter, but is pivoted to the retracted position in response to insertion of the analog compact cassette.

The cassette tape player may have means for regulating a stroke of pivotal movement of the cassette holder relative to the lid. With this stroke regulating means, the loading position of the cassette holder can advantageously be defined at a location angularly spaced from the open position of the lid so that a front edge of the lid adjacent the opening leading into the cassette receiving chamber will not constitute any obstruction to insertion of the compact cassette.

BRIEF DESCRIPTION OF THE DRAWINGS

This and other objects and features of the present invention will become clear from the following description taken in conjunction with a preferred embodiment thereof with reference to the accompanying drawings, in which like parts are designated by like reference numerals and in which:

FIGS. 7(a) and 7(b) are fragmentary side sectional view of the lid and the cassette holder, showing respective manners in which the compact and analog compact cassettes are seated with the lid held in the closed position;

DETAILED DESCRIPTION OF THE EMBODIMENT

Figure 1:
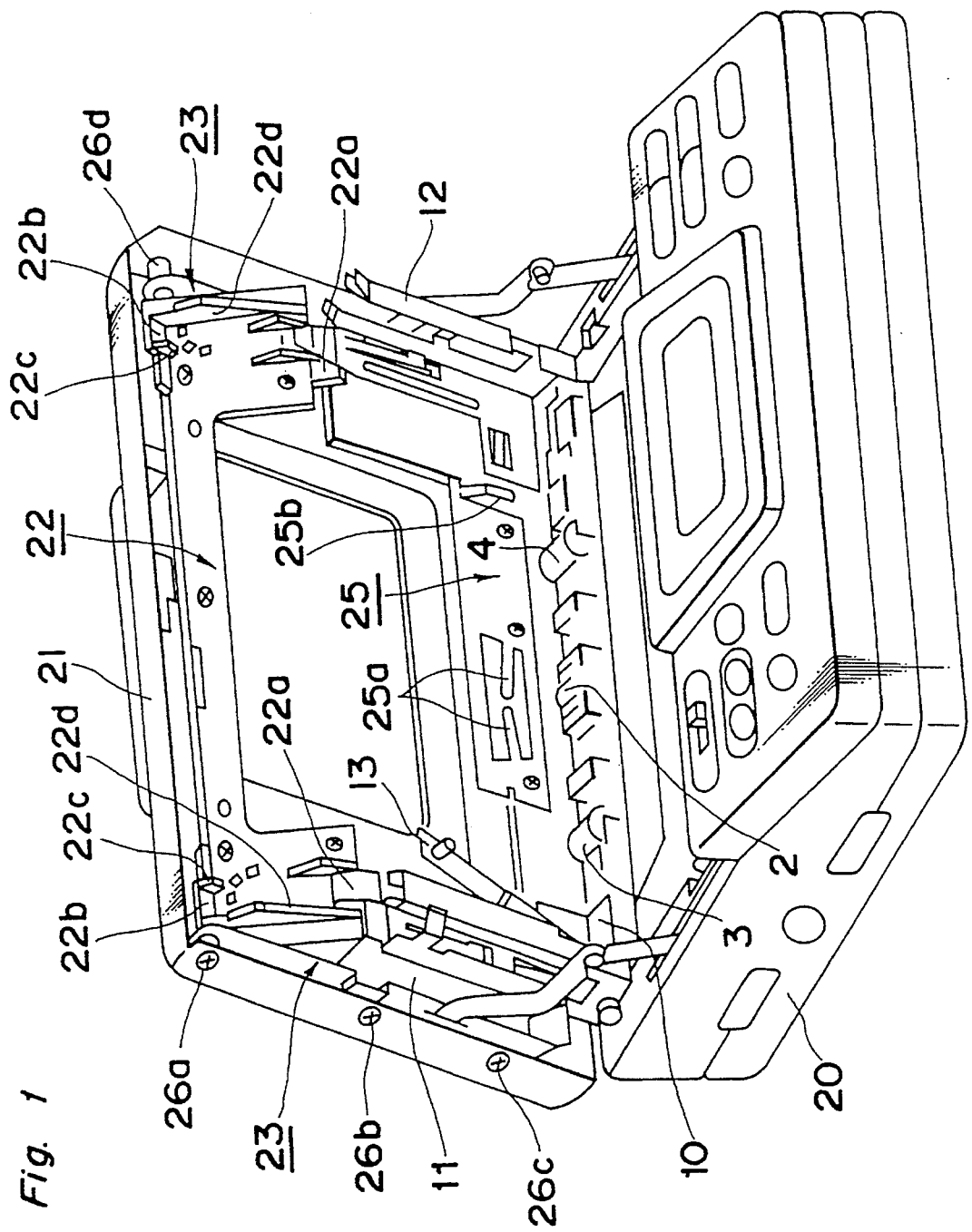
FIG. 1 is a schematic perspective view of a cassette tape player embodying the present invention with a lid thereof held in an opened position.
Figure 5A:
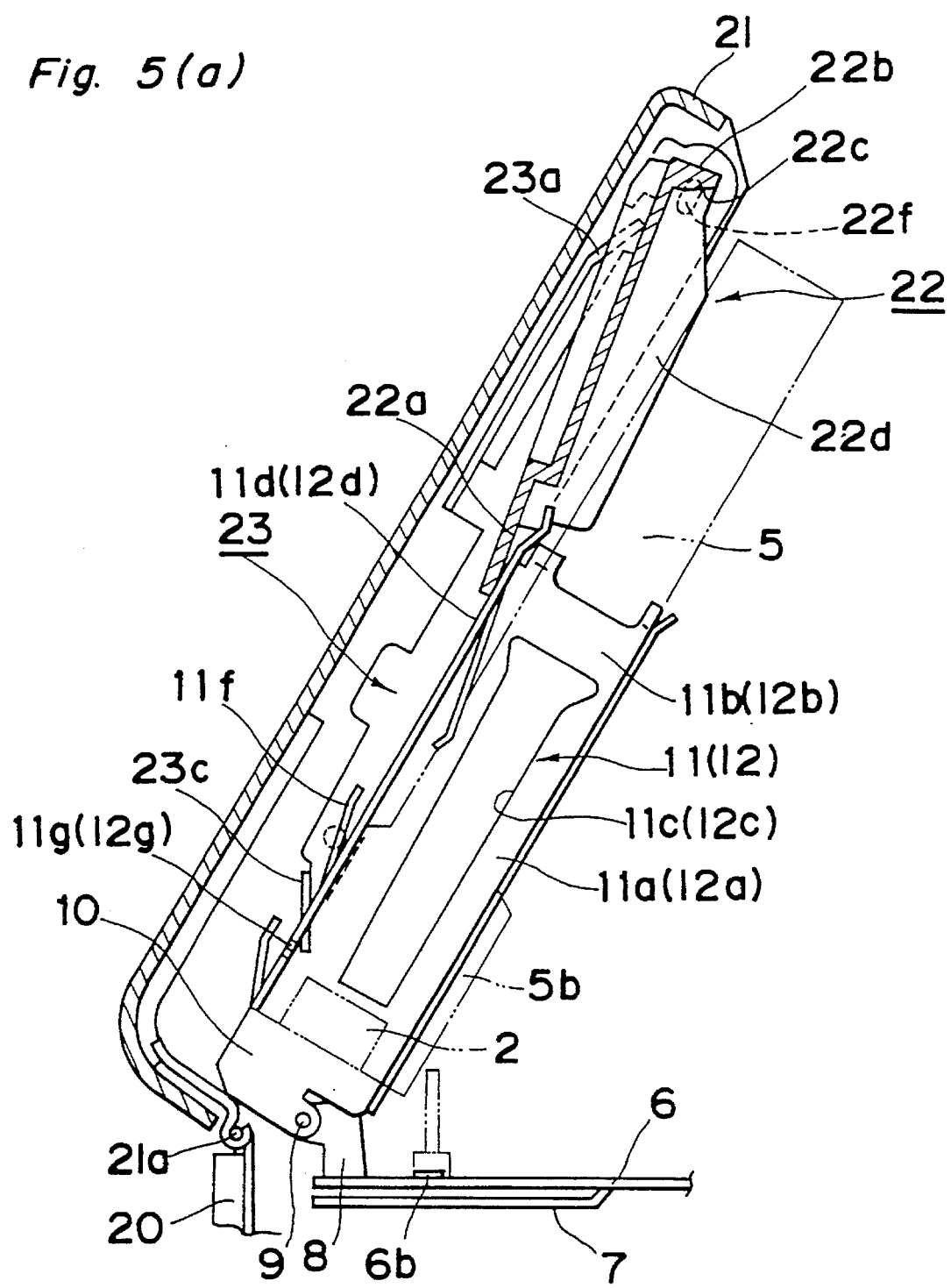
FIGS. 5(a) and 5(b) are side sectional view of the lid held in opened and closed positions, respectively, showing a cassette holder movable together with the lid.
Figure 5B:
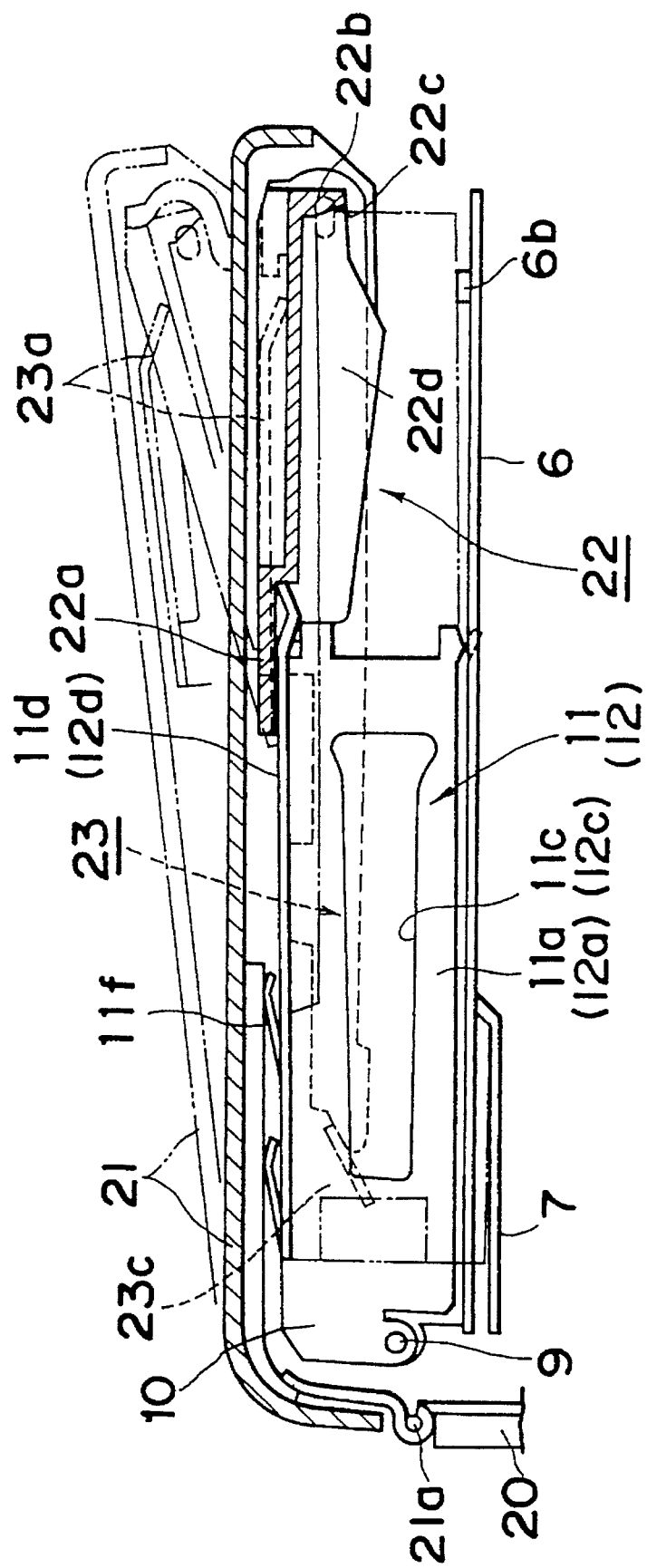

Referring to the accompanying drawings, a cassette tape player embodying the present invention is best shown by 20 in FIG. 1. This cassette tape player 20 comprises an open-topped, generally rectangular box-like housing having a generally rectangular opening, and a lid 21 hinged at 21a to a rear wall of the box-like housing for angular movement through a predetermined angle between an open position, in which as shown in FIGS. 1 and 5(a), a cassette chamber is exposed to the outside, and a closed position in which, as shown in FIGS. 5(b), 7(a) and 7(b), the cassette chamber is concealed.

A generally U-shaped cassette guide 22 for guiding either one of the digital and analog compact cassettes 1 and 5 into a cassette receiving chamber as defined later, a pair of elongated side plates 23 integrally formed with spring elements as will be described later, and a cassette presser 25 having a plurality of first spring tongues 25a and a second spring tongue 25b both integrally formed therewith are all secured to the lid 21 so as to confront the cassette chamber in the cassette tape player 20. The details of each of those elements 22, 23 and 25 will be discussed later.

The cassette tape player 20 also comprises a cassette holder for receiving and holding either one of the analog and digital compact cassettes 5 and 1 once the latter has been inserted to a completely inserted position as will be described later. The cassette holder is supported in a manner as will be described later for pivotal movement between a loading position and an operative position and comprises a generally elongated holder base 10 extending widthwise of the cassette tape player 20 and left and right holder arms 11 and 12, as viewed in FIG. 1 secured at a lower end to respective opposite ends of the holder base 10 for pivotal movement together with the holder base 10. The holder base 10 carries a magnetic recording and/or reproducing head 2 and first and second pitch rollers 3 and 4 mounted thereon with the magnetic head 2 positioned intermediate between the first and second pinch rollers 3 and 4. As is well known to those skilled in the art, the magnetic head 2 and the first and second pinch rollers 3 and 4, all mounted on the holder base 10, are so positioned as to align with the first to third access windows 1a, 1b and 1c of the digital compact cassette 1 or the first to third access windows 5e to 5g of the analog compact cassette 5 when the respective compact cassette is inserted into the cassette tape player 20.

Figure 2:
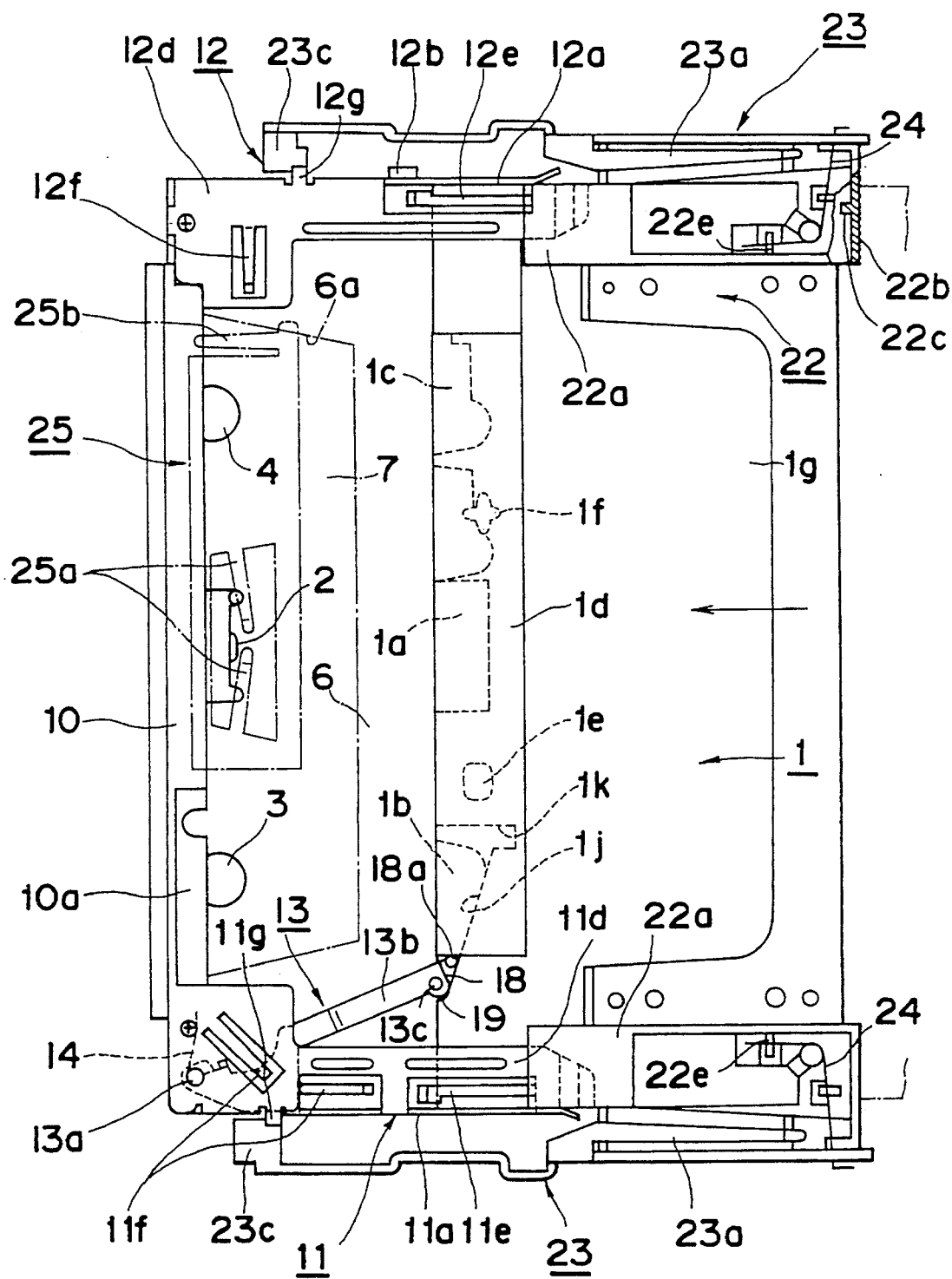
FIG. 2 is a top plan view, with the lid removed, of the cassette tape player, showing a digital compact cassette being inserted.

Although not shown, the first and second pinch rollers 3 and 5 are rotatably supported on the holder base 10 on respective sides of the magnetic head 2 through associated roller carriers which are pivotally connected to the holder base 10 and which are normally biased by spring elements so as to pivot clockwise and counterclockwise, respectively, as viewed in FIG. 2.

Each of the left and right holder arms 11 and 12 is of a generally U-shaped cross-section so contoured as to receive a corresponding side portion of either one of the analog and digital compact cassettes 5 and 1 so that, when the lid 21 is angularly moved to the open position accompanied by the corresponding angular movement of the cassette holder to the loading position as shown in FIGS. 1 and 5(a), either one of the analog and digital compact cassettes 1 and 5 can be inserted into or removed from a cassette receiving chamber, delimited between the cassette holder arms 11 and 12, with its side portions slidingly received by the corresponding holder arms 11 and 12.

Figure 3:
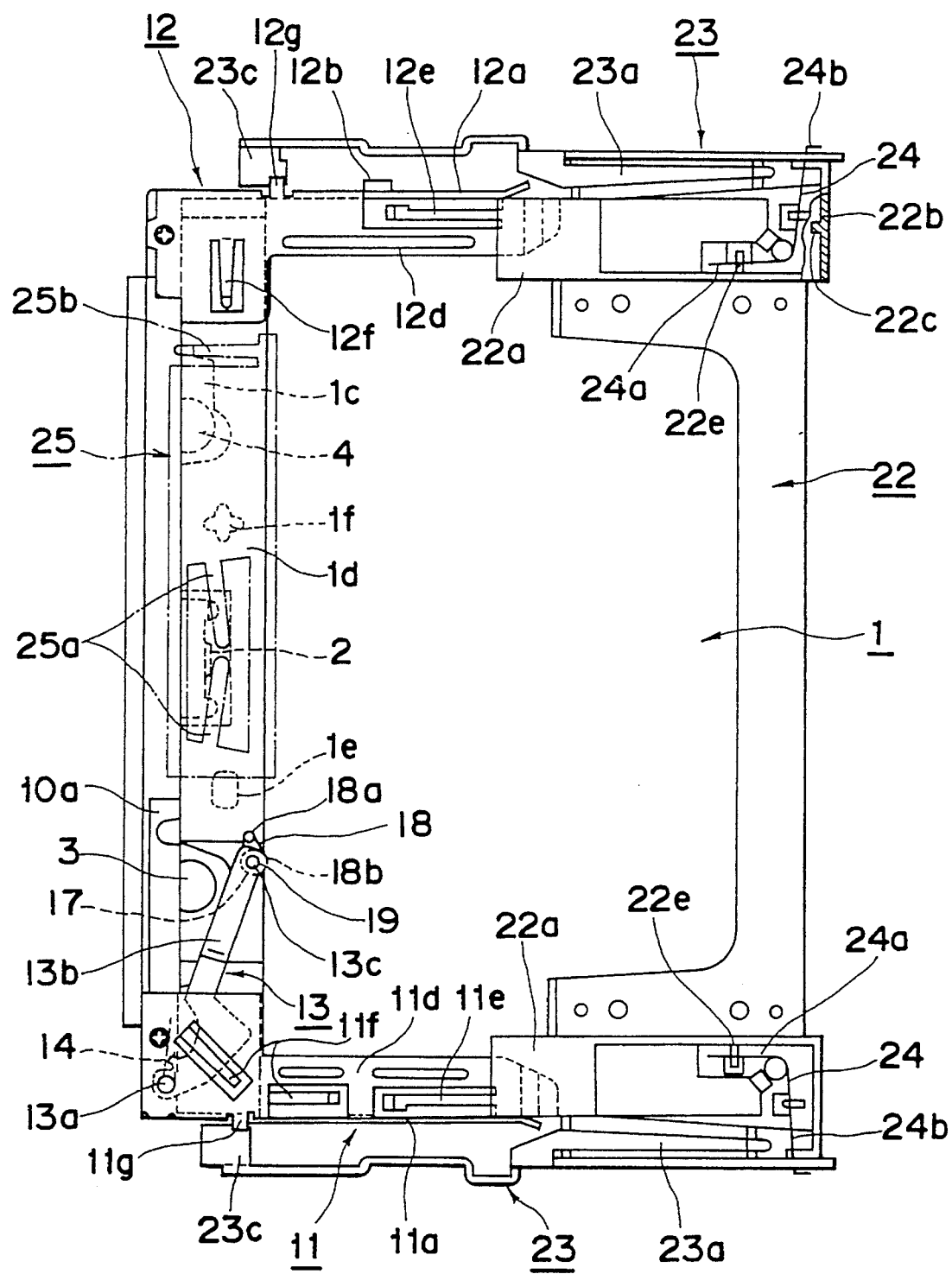
FIG. 3 is a view similar to FIG. 2, showing the digital compact cassette having been completely inserted.
Figure 9A:
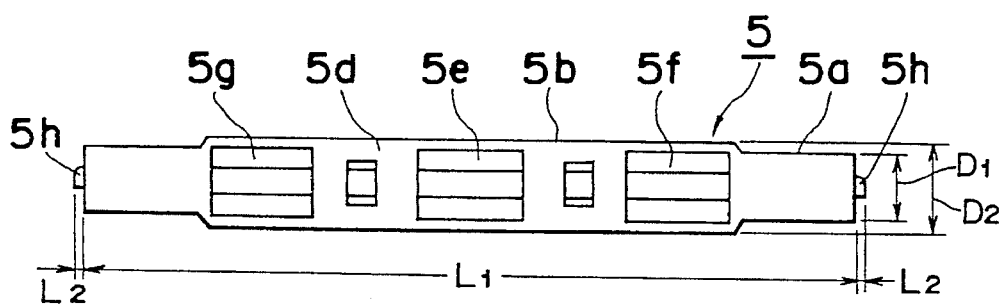
FIG. 9(a) is a front elevational view of the analog compact cassette.
Figure 9B:
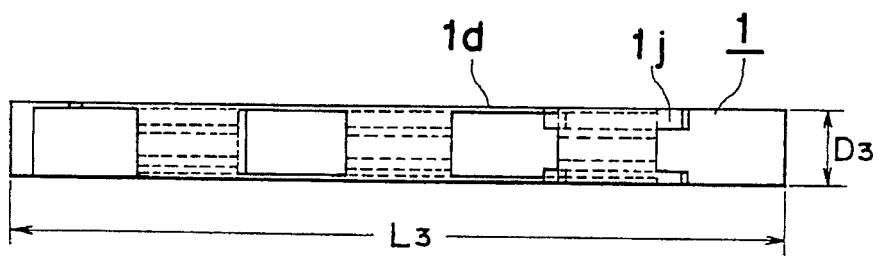
FIGS. 9(b) and 9(c) are front elevational views of the digital compact cassette, showing a protective slide shutter held in closed and opened positions, respectively.

Reference is again made to FIGS. 9(b) and 9(c) for the details of the digital compact cassette 1. As best shown in FIG. 9(b), the first to third access windows 1a to 1c of the digital compact cassette 5 are normally closed by the protective slide shutter 1d that is biased by a spring element so as to assume the closed position as is well known to those skilled in the art. This protective shutter 1d is slidable between the open and closed positions in a direction widthwise of the digital compact cassette 1 and, when it is moved to the open position, the first to third openings defined in the shutter panel of the protective shutter 1d are aligned with the first to third access windows 1a to 1c, respectively. The cassette tape player 20 makes use of a shutter actuating means, as will be described later, which is operable to forcibly move the protective shutter 1d from the closed position towards the open position as the digital compact cassette 1 is inserted into the cassette chamber towards a completely inserted position as shown in FIG. 3. For this purpose, the digital compact cassette 1 has a guide groove 1j defined at a front edge portion of the top panel of the digital compact cassette 1 and in the proximity of the second access window 1b for receiving the shutter actuating means. This guide groove 1j is continued to a shutter lock recess 1k into which the shutter actuating means is trapped, once the protective shutter 1d has been moved to the open position, to keep the protective shutter 1d in the open position.

As shown in FIGS. 2 and 3, the digital compact cassette 1 also has first and second positioning holes 1e and 1f defined in the bottom panel of the digital compact cassette 1 and normally concealed by the bottom panel of the protective shutter 1d so long as the latter is held in the closed position. These positioning holes 1e and 1f allow corresponding positioning pins to pass therethrough, when the lid 21 is closed in readiness for recording or reproduction of information on or from the length of magnetic recording tape, thereby to securely hold the digital compact cassette 1 firmly inside the cassette chamber of the cassette tape player 10.

As is the case with the analog compact cassette 5, the digital compact cassette 1, too, has a pair of reels housed within the casing and a length of magnetic recording tape having its opposite ends anchored to the reels, although they are now shown.

Reference is now to the cassette tape player 20. The cassette tape player 20 includes an upper base plate 6 and a lower base plate 7. The upper base plate 6 has a rear side edge cut off at 6a to accommodate a lower half of the front bulged area 5b of the analog compact cassette 5. As will be described later, this upper base plate 6 has a plurality of, for example, four, cassette seat pieces 6b (FIG. 6) which may be stud pins and which are adapted to support thereon the compact cassette when the lid 21 with the compact cassette received by the cassette holder is pivoted to the closed position. The lower base plate 7 is positioned at a level lower, as viewed in FIGS. 5(a), 5(b), 7(a) and 7(b), than the level of the upper base plate 6 and is supported in position downwardly of the upper base plate 6 by means of a plurality of pillars and corresponding set screws. This lower base plate 7 is of at least a size sufficient to close the cutout 6a in the upper base plate 6 so that the upper base plate 6 cooperates with the lower base plate 7 to partition the player casing into the cassette chamber and a machine chamber in which mechanical and electrical component parts are housed.

Referring to the cassette holder, the holder base 10 is pivotally mounted at its opposite ends by means of pivot pins 9 to support benches 8 fixedly mounted on the upper base plate 6 in the vicinity of the hinge 21a about which the lid 21 pivots. Thus, it will readily be seen that the cassette holder is pivotable about a common axis coaxial with the pivot pins 9 between the loading position, as shown in FIGS. 1 and 5(a), and the operative position as shown in FIGS. 5(b), 7(a) and 7(b). The cassette holder, when pivoted to the loading position, assumes a generally upright position relative to the upper base plate 6 as clearly shown in FIGS. 1 and 5(a) so that either one of the digital and analog compact cassettes 1 and 5 can easily be inserted into the cassette receiving chamber defined between the holder arms 11 and 12. In contrast thereto, when pivoted to the operative position, the cassette holder lies substantially parallel to the upper base plate 6 as shown in FIGS. 5(b), 7(a) and 7(b).

Figure 6:
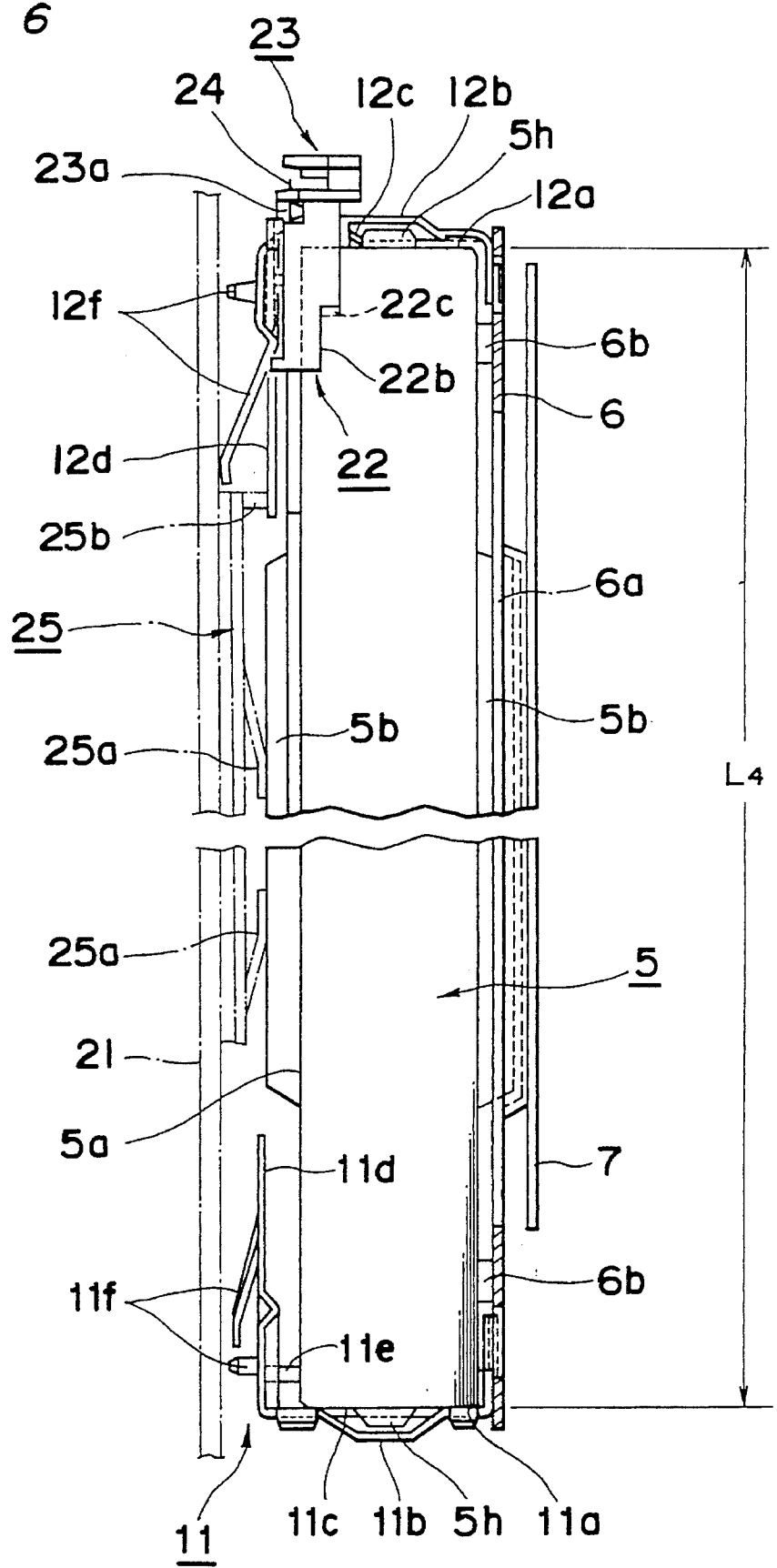
FIG. 6 is a top plan view, on a somewhat enlarged scale, of the cassette holder as viewed in a direction conforming to the direction of insertion of either one of the compact and analog compact cassettes.

Each of the holder arms 11 and 12 includes, as best shown in FIG. 6, a side wall 11a or 12a, a top wall 11d or 12d and a bottom wall, all assembled together, or otherwise integrally formed, to render the respective holder arm 11 or 12 to have a generally U-shaped cross-section. The holder arms 11 and 12 are so mounted on the holder base 10 with the respective side walls 11a and 12a thereof spaced from each other a distance L4 (shown in FIG. 6) corresponding to the width L1 of the analog compact cassette 5 which is in turn equal to the width L3 of the digital compact cassette 1, while the top and bottom walls of each of the holder arms 11 and 12 are spaced from each other a distance substantially equal to or slightly greater than the thickness D3 of the digital compact cassette 1 which is slightly greater than the minimum thickness D1, but slightly smaller than the maximum thickness D2, of the analog compact cassette 5.

The distance L4 of spacing between the side walls 11a and 12a of the respective holder arms 11 and 12 is smaller than the sum of the width of any one of the digital and analog compact cassettes 1 and 5 plus the twofold of the distance L2 of lateral protrusion of each of the guide bars 5h integral with the side wall sections of the analog compact cassette 5. However, each of the side walls 11a and 12a of the associated holder arms 11 and 12 has an escapement slot 11c or 12c defined therein so as to extend longitudinally thereof. At the same time, a portion of each side wall 11a or 12a on one side of the respective escapement slot 11c or 12c remote from the holder base 10 is bent outwardly to define a corresponding escapement recess 11b or 12b of a size sufficient to pass the corresponding guide bar 5h of the analog compact cassette 5 to pass therethrough. Because of the provision of the escapement slots 11c and 12c and the escapement recesses 11b and 12b, the cassette holder employed in the cassette tape player embodying the present invention can accommodate not only the digital compact cassette 1, but also the analog compact cassette 5 having an effective width (L1+2·L2) greater than the width L3 of the digital compact cassette 1.

Considering that the minimum thickness D1 of the analog compact cassette 5 is slightly smaller than the thickness D3 of the digital compact cassette 1 and that the top wall 11d and the bottom wall of each of the holder arms 11 and 12 is spaced a distance corresponding to the thickness D3 of the digital compact cassette 1, the top wall 11d of each holder arm 11 and 12 is formed with at least one elastic tongue 11e or 12e protruding inwardly therefrom so as to press the compact cassette against the associated bottom wall of each holder arm 11 and 12, when either one of the digital and analog compact cassettes 1 and 5 is inserted into the cassette holder, not only for the purpose of accommodating a difference in thickness between the digital and analog compact cassettes 1 and 5, but also for the purpose of stabilizing the inserted compact cassette 1 or 5 in position inside the cassette receiving chamber, as clearly shown in FIGS. 2 to 4 and 6 to 7(b).

Again as shown in FIGS. 2 to 7(b), each of the top walls 11d and 12d of the respective holder arms 11 and 12 is also formed with at least one elastic tongue 11f or 12f protruding outwardly therefrom so as to contact the lid 21, as best shown in FIGS. 7(a) and 7(b), thereby to urge the lid 21 about the hinge 21a in a direction counterclockwise as viewed in FIG. 5(a) so that, when a lid lock (not shown) employed to lock the lid 21 in the closed position as shown in FIGS. 7(a) and 7(b) is released to allow the lid 21 to open, the lid 21 can be popped up to facilitate an easy opening of the lid 21.

It is to be noted that, for the purpose of regulating the stroke of pivotal movement of the cassette holder about the common axis coaxial with the pivot pins 9 relative to the lid 21, the holder arms 11 and 12 are formed with respective engagement pawls 11g and 12g protruding laterally outwardly therefrom in opposite directions away from each other. The engagement pawls 11g and 12g are cooperable with respective barrier pieces 23c integrally formed with respective ends of the elongated side plates 23 remote from the cassette guide 22. The specific function of the engagement pawls 11g and 12g in relation to the barrier pieces 23c will described later in detail.

Reference will now be made to the generally U-shaped cassette guide 22 operable to guide either one of the digital and analog compact cassettes 1 and 5 into the cassette receiving chamber defined in the cassette holder. This cassette guide 22 includes an elongated connecting plate extending widthwise of the cassette tape player 20 and a pair of plate-like guide arms extending at right angles to the connecting plate and having respective free ends generally identified by 22a and integrally formed with respective pairs of angled protuberances 22g engageable with the tape cassette as will be described later. The U-shaped cassette guide 22 is positioned on one side of the cassette holder remote from the holder base 10 and is connected to opposite side walls of the lid 21 in a manner as will be described later for pivotal movement about a hinge axis coaxial with set screws 26a while the free ends 22a of the guide arms are slidably engaged with respective free ends of the top walls 11d and 12d of the holder arms 11 and 12.

The U-shaped cassette guide 22 has a pair of side guide walls 22d formed integrally with the guide arms thereof and positioned adjacent the connecting plate while being spaced from each other a distance corresponding to the width L3 of the digital compact cassette 1 or the width L1 of the analog compact cassette 5. The U-shaped cassette guide 22 also has a pair of transverse guide walls 22b formed integrally with the connecting plate thereof, each of said transverse guide walls 22b being continued at one end to the adjacent side guide wall 22d. The side guide walls 22d cooperate with the transverse guide walls 22b to define generally L-shaped corner walls which, when either one of the digital and analog compact cassettes 1 and 5 is inserted into the cassette receiving chamber in the cassette holder and the lid 21 is subsequently pivoted to the closed position, receive rear corners of the compact cassette with respect to the direction of insertion of the compact cassette into the cassette receiving chamber thereby to suppress any possible undesirable rattling motion of the compact cassette within the cassette receiving chamber.

Preferably, the transverse guide walls 22b may be integrally formed with inclined ribs 22c lying in a plane parallel to the side guide walls 22d and inclined downwardly towards the guide arms of the cassette guide 22. Where the inclined ribs 22c are employed, these inclined ribs 22c are so positioned and so inclined that, when the lid 21 is held in the closed position with either one of the digital and analog compact cassettes 1 and 5 received within the cassette receiving chamber, contact takes place between the inclined ribs 22c and an upper rear edge of the compact cassette to keep the latter urged in a direction towards the holder base 10, regardless of the difference in thickness between the digital and analog compact cassettes 1 and 5, thereby to ensure a firm retention of the compact cassette within the cassette receiving chamber.

The elongated side plates 23 are positioned inwardly of, and firmly secured by means of set screws 26a to 26c to, the opposite side walls of the lid 21. Each of these elongated side plates 23 is made of metallic or resinous material of a kind having an elasticity such as generally used for production of leaf springs and includes a first spring tongue 23a formed integrally therewith so as to be interposed between an inner surface of the lid 21 and the associated guide arm of the cassette guide 22. The first spring tongues 23a integral with the respective elongated side plates 23 have their free ends held elastically in contact with the associated guide arms of the cassette guide 22 to urge the latter in a direction away from the lid 21 while the cassette guide 22 is pivoted a predetermined angle about the hinge axis coaxial with the set screws 26a in a direction counterclockwise as viewed in FIG. 5(a). Thus, so long as the lid 21 is held in the opened position as shown in FIGS. 1 and 5(a), the cassette guide 22 is pivoted the predetermined angle in the counterclockwise direction, as viewed in FIG. 5(a), about the hinge axis coaxial with the set screws 26a by the action of the spring tongues 23a integral with the elongated side plates 23 and, therefore, the guide arms of the cassette guide 22 have their free ends 22a protruding away from the lid 21. In this condition, the cassette holder in the loading position is held at a position displaced an predetermined angular distance from the lid 21, then held in the open position, while the guide arms of the cassette guide 22 define respective slopes generally continued with the upper ends of the holder arms 11 and 12. Even though the opening leading to the cassette receiving chamber in the cassette holder is spaced a distance from the lid 21, the tape cassette can easily and readily be inserted into the cassette receiving chamber with no possibility of plunging in between the cassette holder and the lid 21.

In the foregoing description, the U-shaped cassette guide 22 has been described as pivotally connected to the opposite side walls of the lid 21 by means of set screws 26a which provides a hinge axis about which the cassette guide 22 pivots. In practice, however, hinge connection between the U-shaped cassette guide 22 and each set screw 26a is carried out in a manner which will now be described with particular reference to FIG. 8. While reference will be made to only one of the opposite hinge joints, that is, the hinge joint between one of opposite sides of the cassette guide 22 and the set screw 26a, it is to be understood that a similar hinge joint is formed between the other of the opposite sides of the cassette guide 22 and the set screw 26a.

Figure 8:
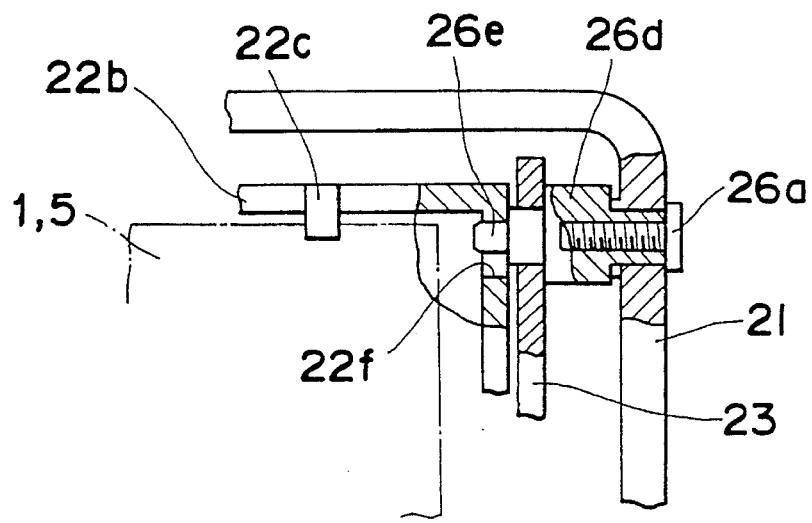
FIG. 8 is a fragmentary sectional view, on an enlarged scale, showing the details of one of pivot joints for a cassette guide.

As best shown in FIG. 8, one end of each elongated plates 23 carries a bearing boss 26d rigidly staked thereto with its opposite ends positioned on respective sides of the associated elongated plate 23. While the elongated side plate 23 is rigidly secured to the adjacent side wall of the lid 21 by means of the set screws 26a to 26c as shown in FIG. 1, the set screw 26a is fastened into the outer end of the bearing boss 26d. On the other hand, the inner end of the bearing boss 26d is reduced in diameter to form a stud shaft 26e which is loosely received in a generally slot-like bearing hole 22f defined in the respective side portion of the cassette guide 22 and having a diameter greater than the diameter of the stud shaft 26e as clearly shown in FIG. 8.

Figure 4:
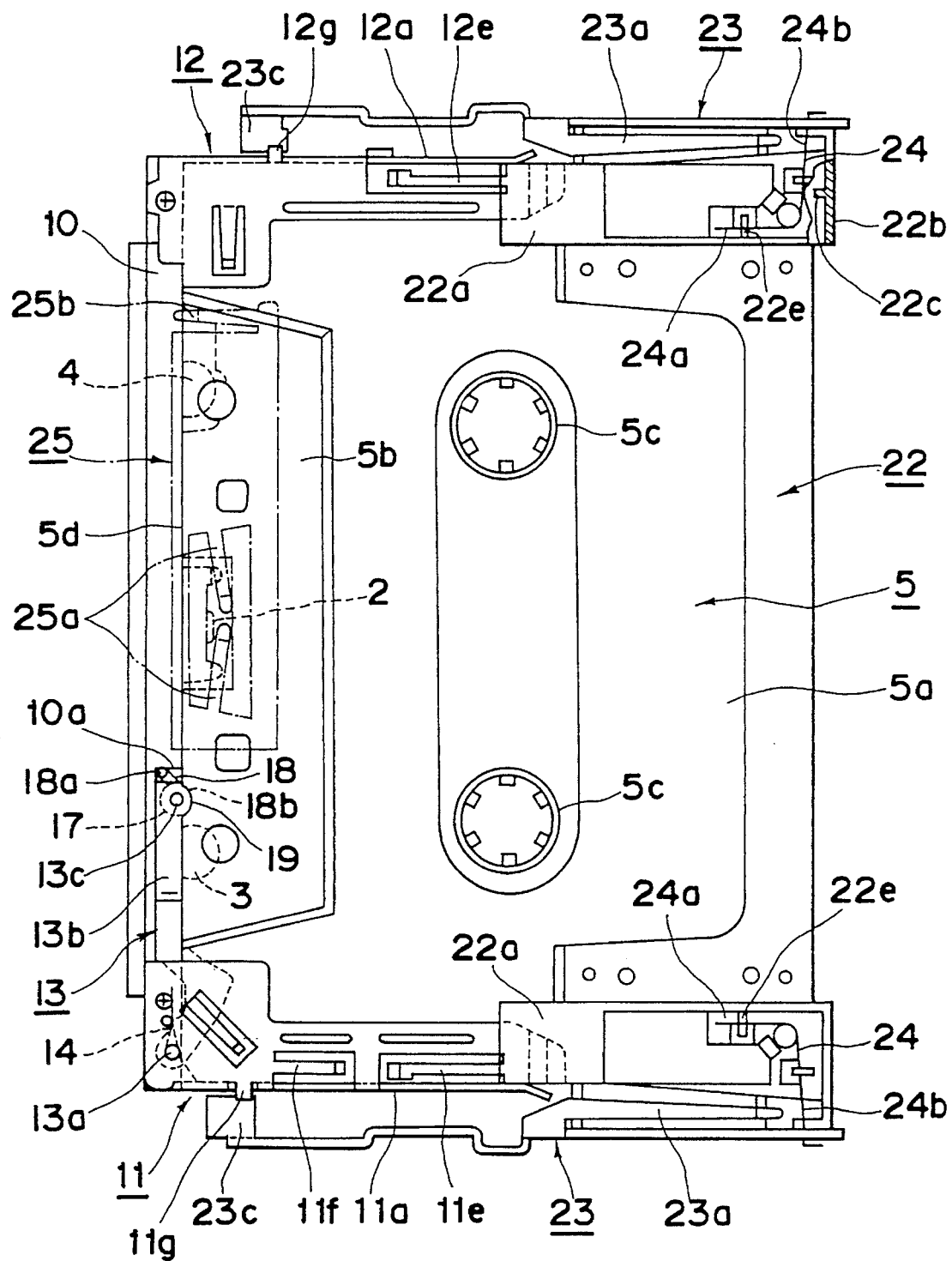
FIG. 4 is a view similar to FIG. 2, showing an analog compact cassette having been completely inserted.

With the U-shaped cassette guide 22 so supported for pivotal movement about the hinge axis coaxial with the set screws 26a, it will readily be seen that the cassette guide 22 is loosely movable in a direction close towards and away from the cassette holder. This U-shaped cassette guide 22 is, however, normally biased towards the cassette holder by the action of second spring elements 24 which are employed in the form of wire springs as best shown in FIGS. 2 to 4. Specifically, each wire spring 24 has one end 24a held in engagement with an anchor piece 22e formed integrally with the cassette guide 22 so as to protrude a slight distance towards the lid 21 and also has the other end 24b engaged in an engagement recess 23b defined in an end portion of the corresponding elongated side plate 23 adjacent the cassette guide 22. Therefore, the cassette guide 22 is normally biased by the wire springs 24 towards the cassette holder.

While the cassette guide 22 is so constructed as hereinabove described, it is to be noted that, while a sufficient pressing force (resilient force) is transmitted from the elastic tongues 11e and 12e to the digital compact cassette 1 to urge the latter towards the bottom walls of the holder arms 11 and 12 since the amount of deformation of each elastic tongue 11e and 12e is relatively great, this pressing force would not be transmitted to the analog compact cassette 5 to urge the latter towards the bottom walls of the holder arms 11 and 12 so much as applied to the digital compact cassette 1 because of the difference in thickness between the digital and analog compact cassettes 1 and 5. However, because of the provision of the inclined ribs 22c engageable with the upper rear edge of the tape cassette (either the digital compact cassette or the analog compact cassette), the tape cassette can be kept urged in a direction towards the holder base 10 and also towards the upper base plate 6, thereby to ensure a firm retention of the tape cassette within the cassette receiving chamber. Another one of the important roles of the cassette guide 22 is that, even though the tape cassette is inserted into the cassette receiving chamber incompletely, i.e., a slight distance short from the completely inserted position, the tape cassette can positively urged towards the holder base 10 with its rear side edge held in sliding contact with the inclined ribs 22c.

To regulate the stroke of pivotal movement of the lid 21 between the open and closed positions about the hinge 21a, the elongate side plates 23 have their intermediate portions pivotally connected with a framework of the cassette player 20 through first and second links articulated with each other as clearly shown in FIG. 1. The cassette holder is pivotable about the common axis coaxial with the pivot pins 9 between the loading and operative positions in response to the pivotal movement of the lid 21 about the hinge 21a between the open and closed positions, respectively. This will now be described in detail, bearing it in mind that the common axis coaxial with the pivot pins 9 about which the cassette holder is pivotable is offset in position relative to the hinge 21a and situated on one side of the holder base 10 opposite to the magnetic head 2.

Assuming that the lid 21 of the cassette tape player 20 is held in the open position as shown in FIG. 5(a), the cassette guide 22 is pivoted counterclockwise, as viewed therein, about a common axis coaxial with the stud shafts 26e by the action of the first spring tongues 23a in the elongated side plates 23 with the free ends 22a of the guide arms of the cassette guide 22 consequently protruding away from the lid 21. On the other hand, because the engagement pawls 11g and 12g integral with the cassette holders 11 and 12 are engaged with the barrier pieces 23c integral with the respective elongated side plates 23, the cassette holder has been pivoted counterclockwise, as viewed in FIG. 5(a), about the common axis coaxial with the pivot pins 9 to assume the loading position in response to the pivotal movement of the lid 21 to the open position.

In this condition shown in FIG. 5(a), although because of the sliding engagement of the free ends 22a of the guide arms of the cassette guide 22 with the free end portions of the top walls 11d and 12d of the respective holder arms 11 and 12, the cassette holder is tended to pivot clockwise about the common axis coaxial with the pivot pins 9, the engagement between the engagement pawls 11g and 12g and the associated barrier pieces 23c restricts the cassette holder to the loading position without allowing the cassette holder to pivot clockwise as viewed in FIG. 5(a).

Also, with the free ends 22a of the guide arms of the cassette guide 22 protruding away from the lid 21 by the action of the first spring tongues 23a then urging the cassette guide 22 to pivot counterclockwise about a common axis coaxial with the stud shafts 26e, the transverse guide walls 22b in the cassette guide 22 are retracted clear from a path along which either one of the digital and analog compact cassettes 1 and 5 is inserted into or removed from the cassette receiving chamber as clearly shown in FIG. 5(a) and will not therefore constitute any obstacle to the insertion or removal of the compact cassette.

On the other hand, when the lid 21 has been moved to the closed position as shown in FIG. 5(b), the cassette holder is laid substantially flat against the upper base plate 6 and parallel to the lid 21 to assume the operative position and the lid 21 is locked by the lid lock (not shown) in the closed position against the resilient force exerted by the elastic tongues 11f and 12f integral with the holder arms 11 and 12 and also that exerted by the first spring tongues 23a integral with the elongated side plates 23. In this condition, the cassette guide 22 has been pivoted clockwise, as viewed in FIG. 5(b), against the first spring tongues 23a because the top walls 11d and 12d of the holder arms 11 and 12 of the cassette holder then held in and unable to exceed the operative position press the free ends 22a of the guide arms of the cassette guide 22. At the same time, not only are the elastic tongues 11f and 12f integral with the respective holder arms 11 and 12 depressed in contact with the lid 21 against their own resiliency, but also the angled protuberances 22g integral with the free ends 22a of the guide arms of the cassette guide 22 are brought into contact with the tape cassette to retain the latter firmly in position within the cassette chamber in cooperation with the resilient forces of the elastic tongues 11e and 12e integral with the holder arms 11 and 12. Therefore, so long as the lid 21 is in the closed position with the cassette holder held in the operative position, the first spring tongues 23a integral with the elongated side plates 23 and the elastic tongues 11f and 12f integral with the respective holder arms 11 and 12 are held in a condition accumulating resilient forces required to permit them to return to the original shape. Those resilient forces accumulated in the first spring tongues 23a and the elastic tongues 11f and 12f effectively work to suppress any possible generation of undesirable resonance among the lid 21, the cassette guide 22 and the holder arms 11 and 12. On the other hand, with the lid 21 held in the closed position, the engagement pawls 11g and 12g integral with the holder arms 11 and 12 are disengaged from the associated barrier pieces 23c integral with the elongated side plates 23.

When the lid lock (not shown) is released, while the lid 21 is in the closed position as shown in FIG. 5(b), in an attempt to open the lid 21, the lid 21 is automatically popped up a predetermined angular distance towards the open position by the action of the resilient forces, which have been accumulated in the elastic tongues 11f and 12f and the first spring tongue 23a in the manner described above, until the engagement pawls 11g and 12g integral with the holder arms 11 and 12 are brought into engagement with the associated barrier pieces 23c integral with the elongated side plates 23. The lid 21 so popped up is shown by the phantom line in FIG. 5(b). At this time the cassette holder remains in the operative position. Once the lid 21 is popped up, the user of the cassette tape player 20 can manually pull the lid 21 to pivot the latter about the hinge 21a towards the open position as shown in FIG. 5(a). As the lid 21 is pivoted towards the open position, the cassette holder is correspondingly pivoted about the common axis coaxial with the pivot pins 9 towards the loading position with the engagement pawls 11g and 12g engaged with the associated barrier pieces 23c.

Assuming again that the lid 21 is locked in the closed position with either one of the digital and analog compact cassettes 1 and 2 received in the cassette holder, the cassette presser 25 secured to the inner surface of the lid 21 works to retain the compact cassette in position within the cassette chamber of the cassette tape player 20. More specifically, where the analog compact cassette 5 is inserted in the cassette holder, the first spring tongues 25a are held in contact with the bulged area 5b of the analog compact cassette 5 to urge the latter towards the upper base plate 6 thereby to retain the latter stably within the cassette chamber. On the other hand, where the digital compact cassette 1 is inserted in the cassette holder, the second spring tongue 25b is held in contact with the shutter 1d, then opened, to urge the digital compact cassette 1 towards the upper base plate 6 thereby to retain the latter stably within the cassette chamber.

FIGS. 3 and 4 illustrate respective conditions in which the digital compact cassette 1 and the analog compact cassette 1 are completely inserted in the cassette holder, respectively. Schematic side sectional representations of the corresponding conditions of FIGS. 3 and 4 are shown in FIGS. 7(a) and 7(b), respectively.

As shown therein, so long as the lid 21 is in the closed position with the cassette holder held at the operative position while the compact cassette 1 or 5 has been received in the cassette receiving chamber of the cassette holder, the compact cassette 1 or 5 is urged to rest on the cassette seat pieces 6b as best shown in FIG. 6. Specifically, in the case of the analog compact cassette 5 shown in FIGS. 4, 6 and 7(b), the analog compact cassette 5 is so urged to rest on the cassette seat pieces 6b by the action of the elastic tongues 11e and 12e integral with the holder arms 11 and 12, the first spring tongues 23a integral with the respective elongated side plates 23 and used to urge the cassette guide 22, and the first spring tongues 25a rigid with the lid 21, but in the case of the digital compact cassette 1 shown in FIGS. 3 and 7(a), the digital compact cassette 1 is so urged to rest on the cassette seat pieces 6b by the action of the elastic tongues 11e and 12e, the first spring tongues 23a and the second spring tongues 25b.

At the same time, the compact cassette 1 or 5 is urged towards the holder base 10, where the magnetic head 2 is mounted, by the action of the wire springs 24, acting on the cassette guide 44 to urge the latter in a direction towards the cassette holder as hereinbefore described, in combination with the inclined ribs 22c integral with the respective transverse guide walls 22b.

Specifically, since the hinge axis about which the lid 21 pivots between the open and closed positions and the hinge axis about which the cassette holder pivots between the loading and operative positions are offset relative to each other in a direction conforming to the direction of insertion of the compact cassette 1 or 5 into the cassette receiving chamber, the transverse guide walls 22b including the inclined ribs 22c are clear from a rear edge of the compact cassette with respect to the direction of insertion during the insertion of the compact cassette 1 or 5 into the cassette receiving chamber while the lid 21 is in the open position with the cassette holder held at the loading position as shown in FIG. 5(a). However, when the compact cassette 1 or 5 has been completely inserted into the cassette receiving chamber and the lid 21 is subsequently pivoted to the closed position with the cassette holder held at the operative position as shown in FIG. 3 or 4, the inclined ribs 22c integral with the transverse guide walls 22b in the cassette guide 22 are brought into sliding contact with the rear edge of the compact cassette 1 or 5 thereby to transmit the biasing forces of the wire springs 24 therethrough to the compact cassette 1 or 5 so that the latter is positively urged towards the holder base or the magnetic head 2 within the cassette receiving chamber.

In this way, either one of the digital and analog compact cassettes 1 and 5 can conveniently be stabilized at a position ready for recording or reproduction of information on or from the length of magnetic tape accommodated within the compact cassette 1 or 5. It is, however, to be noted that, although reference has been made to the use of the four cassette seat pieces 6b, the number thereof may not be limited thereto, but three or more cassette seat pieces may be employed.

Figure 9C:
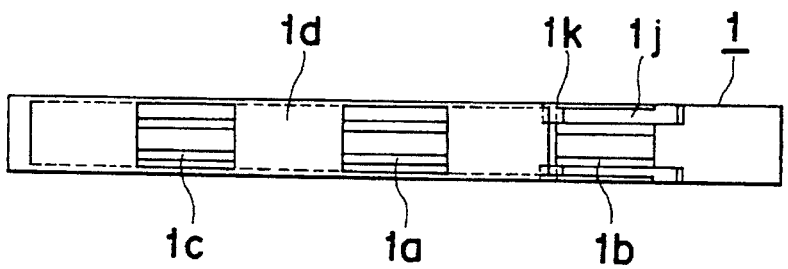

Reference will now be made to a shutter actuating means 13 used to open the protective slide shutter 1d, that is, move the shutter 1d to an open position as shown in FIG. 9(c) as the digital compact cassette 1 is inserted into the cassette receiving chamber towards the completely inserted position. This shutter actuating means 13 is best shown in FIGS. 1 to 4.

The shutter actuating means 13 includes an actuating lever 13b pivotally connected at a lower end 13a thereof to the holder base 10 for movement between an erected position, as shown in FIGS. 1 and 2, and a folded position as shown in FIG. 4, an engagement piece 13c formed integrally with, or otherwise rigidly connected with, a free end of the actuating lever 13b so as to protrude into the cassette receiving chamber, and a biasing spring 14 in the form of a wire spring for normally urging the actuating lever in a clockwise direction, as viewed in FIGS. 2 to 4, to the erected position. This shutter actuating means 13 is thus carried by the cassette holder with the actuating lever 13b movable in a plane substantially between the lid 21 and the compact cassette 1 or 5 inserted in the cassette receiving chamber in the cassette holder. It is to be noted that the biasing spring 14 serves not only to urge the actuating lever 13b towards the erected position, but also to urge the actuating lever 13b in a direction generally perpendicular to the lengthwise direction of the actuating lever 13b so as to ensure a reliable contact between the engagement piece 13c and the front of either one of the digital and analog compact cassettes 1 and 5 being inserted into the cassette chamber.

The shutter actuating means 13 is so designed and so structured that, as the digital compact cassette 1 is inserted into the cassette receiving chamber while the cassette holder is held in the loading position, the engagement piece 13c is engaged into the guide groove 1j (FIGS. 2 and 9(c)) defined in the digital compact cassette 1 and that, as the digital compact cassette 1 is further inserted by the application of an external pushing force thereto, the engagement piece 13c slides along an inclined wall defining the guide groove 1j accompanied by a pivotal movement of the actuating lever 13b against the biasing spring 14 towards the folded position as best shown in FIG. 2 while the shutter 1d is driven towards the open position in contact with the engagement piece 13c against the biasing force of the spring element (not shown) used to hold the shutter 2d at the closed position.

When the digital compact cassette 1 is completely inserted into the cassette receiving chamber as shown in FIG. 3, not only is the actuating lever 13b held at the folded position, but the shutter 1d is moved to the open position with the engagement piece 13c received within the shutter lock recess 1k. In this condition, the magnetic head 2 and the pinch rollers 3, both carried by the holder base 10 of the cassette holder, relatively protrude into the first to third access openings 1a to 1c of the digital compact cassette 1 to engage the length of magnetic recording tape.

The actuating lever 13b has been described as pivotable to the folded position when the digital compact cassette has been completely inserted. In practice, however, arrangement has been made that the actuating lever 13b can further pivot a slight angular distance beyond the folded position until the actuating lever 13b including the engagement piece 13c is completely retracted behind the holder base 10. This is not only for the purpose of enabling the cassette tape player 20 to accommodate the analog compact cassette 5, but also for the purpose of avoiding any possible damage to the shutter actuating means 13 when either one of the digital and analog compact cassettes 1 and 5 is inserted in the wrong way with the rear thereof oriented towards the cassette holder or when an excessive finger pressure is applied thereto.

As best shown in FIGS. 2 to 4, a lateral side portion of the holder base 10 which substantially correspond in position to the folded position of the shutter actuating lever 13b is inwardly recessed to define an escapement pocket 10a into which the shutter actuating lever 13b including the engagement piece 13c is completely accommodated after having pivoted beyond the folded position. While the engagement piece 13c is normally positioned at a location protruding a distance forwardly of the holder base towards the cassette receiving chamber when the shutter actuating lever 13b is in the folded position with the engagement piece 13c trapped in the shutter lock recess 1k in the digital compact cassette 1, the shutter actuating lever 13b including the engagement piece 13c is completely received within the escapement pocket 10a when the analog compact disc 5 has been completely inserted into the cassette receiving chamber as best shown in FIG. 4.

Thus, it will readily be understood that, where the analog compact cassette 5 is inserted into the cassette receiving chamber of the cassette holder, the front of the bulged area 5b of the analog compact cassette 5 is brought into contact with the engagement piece 13c and a further push of the analog compact cassette 5 causes the shutter actuating lever 13b to pivot counterclockwise against the biasing spring 14 towards a retracted position past the folded position. When the analog compact cassette 5 is subsequently completely inserted into the cassette receiving chamber as shown in FIG. 4, the actuating lever 13b is retracted into the escapement pocket 10a in the holder base 10, permitting the magnetic head 2 and the pinch rollers 3 to relatively protrude into the first to third access openings 5e to 5g of the analog compact cassette 5 to engage the length of magnetic recording tape.

Preferably, as shown in FIG. 7, the engagement piece 13c is in the form of a stud shaft 16 rotatably and non-detachably carried by the actuating lever 13b and slidingly engageable with one end of the shutter 1d after it has been brought into the guide groove 1j in the digital compact cassette 1, and a boss 17 of a diameter slightly greater than that of the stud shaft 16 mounted on a free end of the stud shaft 16 and adapted to be engaged in the shutter lock recess 1k when and after the shutter 1d has been moved to the opened position in contact with the stud shaft 16. It is to be noted that the stud shaft 16 does not contact any wall defining the shutter lock recess 1k in the digital compact cassette 1 when the shutter actuating lever 13b has been moved to the folded position.

The free end of the shutter actuating lever 13c is also formed with an engagement piece 18 for sliding engagement with the front of the bulged area 5b of the analog compact cassette 5 and also with a collar 19 of a diameter greater than the boss 17 positioned on one side of the engagement piece 13c remote from the pivot end 13a. A front guide 18a is formed on a portion of the free end of the shutter actuating lever 13b adjacent the magnetic head 2, said front guide 18a having an abutment 18b of a diameter slightly smaller than that of the collar 19 formed therein at a location spaced from the collar 19. The front guide 18a and the abutment 18b on the shutter actuating lever 13b are so operated that, as the analog compact cassette 5 is inserted into the cassette receiving chamber of the cassette holder, the front of the bulged area 5b of the analog compact cassette 5 is first brought into contact with the front guide 18a and then with the abutment 18b to facilitate a smooth pivotal movement of the shutter actuating lever 13b. At this time, the collar 19 integral with the free end of the shutter actuating lever 13b slides over onto the bulged area 5b of the analog compact cassette 5 thereby avoiding an undesirable ingress of the free end of the shutter actuating lever 13b into the second access window 5f in the analog compact cassette 5.

The engagement piece 18 is preferably made of synthetic resin to facilitate a smooth sliding motion in contact with the front of the bulged area 5b of the analog compact cassette 5 without giving damages thereto while permitting the shutter actuating lever 13b to pivot towards the retracted position. As shown in FIG. 13, the front guide 18a integral with the engagement piece 18 does not contact any portion of the shutter 1d in the event that the digital compact cassette 1 is inserted into the cassette receiving chamber, and is positioned above the shutter 1d.

In the illustrated embodiment of the present invention, engagement between the engagement piece 13c and the shutter 1d takes place when the compact cassette 1 or 5 is inserted halfway in the cassette receiving chamber as shown in FIG. 2. For this purpose, each of the holder arms 11 and 12 is so designed as to have a length sufficient to protrude outwardly from the position where the free end of the shutter actuating lever 13b occupies when held in the erected position as can be seen in FIG. 2. Because of this, when the front of either of the digital and analog compact cassettes 1 and 5 is substantially brought into contact with the engagement piece 13c on the shutter actuating lever 13b, a substantially half of the compact cassette 1 or 5 has already been received in the cassette receiving chamber while embraced by the holder arms 11 and 12 and, therefore, a reliable engagement between the shutter 1d and the engagement piece 13c, when the digital compact cassette 5 is inserted, is ensured indeed.

In addition, due to the length of each of the holder arms 11 and 12 discussed above, even though the holder arms 11 and 12 are formed with the respective escapement slots 11c and 12c defined in the side walls 11a and 12a thereof for accommodating the lateral guide bars 5h integral with the analog compact cassette 1, formation of the corresponding escapement recesses 11b and 12b enhances a physical strength of the holder arms 11 and 12 thereby avoiding any possible deformation of one or both of the holder arms 11 and 12 which would otherwise occur when the compact cassette is inserted in the wrong way.

The operation of the cassette tape player 20 of the above described construction in accordance with the present invention will now be described.

The loading of the digital compact cassette 1 into the cassette tape player 20 will first be described. Assuming that the lid 21 is moved to the open position, accompanied by the corresponding movement of the cassette holder to the loading position with the engagement pawls 11g and 12g engaged with the associated barrier pieces 23c, the digital compact cassette 1 is inserted from above into the cassette receiving chamber defined between the holder arms 11 and 12 in a direction as indicated by the arrow in FIG. 2. Initial insertion of the digital compact cassette 1 into the cassette receiving chamber is advantageously facilitated by the employment of the cassette guide 22. Specifically, as hereinbefore described, since the cassette guide 22 is urged by the first spring tongue 23a integral with the elongated side plates 23, secured to the lid 21, with the free ends 22a of the guide arms thereof generally continued to the respective free ends of the top walls 11d and 12d of the holder arms 11 and 12, and since the side guide walls 22d integral with the respective guide arms of the cassette guide 22 cooperate to restrict any possible lateral displacement of the compact cassette being inserted, there is less possibility that the compact cassette 1 or 5 may be erroneously inserted in between the top walls 11d and 12d of the holder arms 11 and 12 and the lid 21. Thus, a further one of the important roles of the cassette guide 22 is to smoothly guide the compact cassette into the cassette receiving chamber.

When the digital compact cassette 1 is inserted a certain distance into the cassette receiving chamber as shown in FIG. 2, the front of the digital compact cassette 1 is brought into contact with the shutter actuating lever 13b with the engagement piece 13c consequently engaging in the guide groove 1j. As the digital compact cassette 1 is further inserted towards the completely inserted position by the application of an external pushing force, the engagement piece 13c carried by the shutter actuating lever 13 drives the shutter 1d against the biasing force, tending to close the shutter 1d, towards the opened position while the shutter actuating lever 13b is pivoted counterclockwise, as viewed in FIG. 2, against the biasing spring 14. Consequently, continued insertion of the digital compact cassette 1 causes the shutter 1d to be opened progressively.

Simultaneously or substantially simultaneously with the arrival of the digital compact cassette 1 at the completely inserted position as shown in FIG. 3, the engagement piece 13c is trapped into the shutter lock recess 1k in the digital compact cassette to lock the shutter 1d in the open position, allowing the magnetic head 2 and the pinch rollers 3 and 4 to protrude into the digital compact cassette 5 through the first to third access windows 1a to 1c.

The elastic tongues 11e and 12e integral with the holder arms 11 and 12 and protruding into opposite side portions of the cassette receiving chamber apply a resilient force to the compact cassette being inserted and, therefore, an undesirable abrupt collision of the compact cassette against the holder base 10 and the related component parts is advantageously minimized. As hereinbefore described, these elastic tongues 11e and 12e also serve to apply the resilient force to the inserted compact cassette to urge the latter so as to be firmly seated on the cassette seat pieces 6b on the upper base plate 6 when the lid 21 is closed with the cassette holder laid down to the operative position.

After the complete insertion of the compact cassette into the cassette receiving chamber, the lid 21 is pivoted from the open position towards the closed position by the application of an external pushing force. During the pivotal movement of the lid 21, and since the composite resilient force of the first spring tongue 23a is applied to the holder arms 11 and 12 through the guide arms of the cassette guide 22 while the barrier pieces 23c integral with the elongated side plates 23 are engaged with the associated engagement pawls 11g and 12g integral with the holder arms 11 and 12, the cassette holder carrying the inserted compact cassette will not fall flat against the upper base plate 6 independent of the pivotal movement of the lid 21 towards the closed position. Thus, the pivotal movement of the lid 21 towards the closed position is accompanied by a corresponding pivotal movement of the cassette holder from the loading position towards the operative position.

Shortly before the arrival of the lid 21 to the closed position, the cassette holder carrying the inserted compact cassette is laid down substantially to the operative position with the barrier pieces 23c disengaged from the associated engagement pawls 11g and 12g. Thereafter, the continued application of the external pushing force to the lid 21 results in the lid 21 locked in the closed position in any known manner.

Once the lid 21 is locked in the closed position, the composite resilient force of the spring tongues 23a and that of the second spring tongues 25b fast with the lid 21 act on the digital compact cassette 1 to urge the latter so as to be firmly seated on the cassette seat pieces 6b as shown in FIG. 6 without allowing the compact cassette to undergo any vibratory motion within the cassette chamber of the cassette tape player 20. At the same time, the inclined ribs 22c integral with the transverse guide walls 22b in the cassette guide 22 then urged by the wire spring 24 are brought into contact with the rear edge of the compact cassette and, therefore, the compact cassette with the cassette holder held in the operative position while the lid 21 is completely closed is urged in a direction conforming to the direction of insertion thereof to ensure a reliable engagement of the magnetic head with the length of magnetic recording tape.

On the other hand, the loading of the analog compact cassette 5 into the cassette tape player 20 is carried out in a manner substantially similar to the loading of the digital compact cassette 1 described above. More specifically, assuming that the lid 21 is moved to the open position, accompanied by the corresponding movement of the cassette holder to the loading position with the engagement pawls 11g and 12g engaged with the associated barrier pieces 23c, the analog compact cassette 5 is inserted from above into the cassette receiving chamber defined between the holder arms 11 and 12 in a direction as indicated by the arrow in FIG. 2.

Initial insertion of the analog compact cassette 5 into the cassette receiving chamber is similarly advantageously facilitated by the employment of the cassette guide 22. Specifically, as hereinbefore described, since the cassette guide 22 is urged by the first spring tongue 23a integral with the elongated side plates 23, secured to the lid 21, with the free ends 22a of the guide arms thereof generally continued to the respective free ends of the top walls 11d and 12d of the holder arms 11 and 12, and since the side guide walls 22d integral with the respective guide arms of the cassette guide 22 cooperate to restrict any possible lateral displacement of the compact cassette being inserted, there is less possibility that the compact cassette 5 or 5 may be erroneously inserted in between the top walls 11d and 12d of the holder arms 11 and 12 and the lid 21. Thus, one of the important roles of the cassette guide 22 is to smoothly guide the compact cassette into the cassette receiving chamber.

Also, the presence of the escapement slots 11c and 12c and the escapement recesses 11b and 12b, both defined in the side walls 11a and 12a of the holder arms 11 and 12, is effective to allow the lateral guide bars 5h integral with the analog compact cassette 1 to pass into the cassette receiving chamber even though the effective width (L1+2·L2) of the analog compact cassette 5 is greater than the width L3 of the digital compact cassette 1.

When the analog compact cassette 5 is inserted a certain distance into the cassette receiving chamber in a manner similar to that shown in FIG. 2, the front of the analog compact cassette 5 is brought into contact with the free end of the shutter actuating lever 13b. As the analog compact cassette 5 is further inserted towards the completely inserted position by the application of an external pushing force, the shutter actuating lever 13 is pivoted counterclockwise towards the folded position against the biasing spring 14.

Simultaneously or substantially simultaneously with the arrival of the analog compact cassette 5 at the completely inserted position as shown in FIG. 4, the shutter actuating lever 13b has been moved past the folded position and is received within the escapement pocket 10a defined in the holder base 10, allowing the magnetic head 2 and the pinch rollers 3 and 4 to protrude into the analog compact cassette 5 through the first to third access windows 1a to 1c.

The elastic tongues 11e and 12e integral with the holder arms 11 and 12 and protruding into the opposite side portions of the cassette receiving chamber apply a resilient force to the compact cassette being inserted and, therefore, an undesirable abrupt collision of the compact cassette against the holder base 10 and the related component parts is advantageously minimized. As hereinbefore described, these elastic tongues 11e and 12e also serve to apply the resilient force to the inserted compact cassette to urge the latter so as to be firmly seated on the cassette seat pieces 6b on the upper base plate 6 when the lid 21 is closed with the cassette holder laid down to the operative position.

After the complete insertion of the compact cassette into the cassette receiving chamber, the lid 21 is pivoted from the open position towards the closed position by the application of an external pushing force. During the pivotal movement of the lid 21, and since the composite resilient force of the first spring tongue 23a is applied to the holder arms 11 and 12 through the guide arms of the cassette guide 22 while the barrier pieces 23c integral with the elongated side plates 23 are engaged with the associated engagement pawls 11g and 12g integral with the holder arms 11 and 12, the cassette holder carrying the inserted compact cassette will not fall flat against the upper base plate 6 independent of the pivotal movement of the lid 21 towards the closed position. Thus, the pivotal movement of the lid 21 towards the closed position is accompanied by a corresponding pivotal movement of the cassette holder from the loading position towards the operative position.

Shortly before the arrival of the lid 21 to the closed position, the cassette holder carrying the inserted compact cassette is laid down substantially to the operative position with the barrier pieces 23c disengaged from the associated engagement pawls 11g and 12g. Thereafter, the continued application of the external pushing force to the lid 21 results in the lid 21 locked in the closed position in any known manner.

Once the lid 21 is locked in the closed position, the composite resilient force of the spring tongues 23a and that of the first spring tongues 25a fast with the lid 21 and brought into contact with the bulged area 5b of the analog compact cassette 5 act on the analog compact cassette 5 to urge the latter so as to be firmly seated on the cassette seat pieces 6b as shown in FIG. 6 without allowing the compact cassette to undergo any vibratory motion within the cassette chamber of the cassette tape player 20. At the same time, the inclined ribs 22c integral with the transverse guide walls 22b in the cassette guide 22 then urged by the wire spring 24 are brought into contact with the rear edge of the compact cassette and, therefore, the compact cassette with the cassette holder held in the operative position while the lid 21 is completely closed is urged in a direction conforming to the direction of insertion thereof to ensure a reliable engagement of the magnetic head with the length of magnetic recording tape. It is to be noted that, so long as the cassette holder carrying the analog compact cassette 5 is held in the operative position, a lower half of the bulged area 5b is accommodated in the cutout 6a in the upper base plate 6.

Although the present invention has been described in connection with the preferred embodiment thereof with reference to the accompanying drawings, it is to be noted that various changes and modifications are apparent to those skilled in the art. By way of example, although in describing the preferred embodiment of the present invention, reference has been made to the cassette tape player operable with either one of the digital and analog compact cassettes, the present invention can be equally applicable to the cassette tape player of either a type operable only with the digital compact cassette or a type operable only with the analog compact cassette.

Also, in the foregoing embodiment of the present invention, separate spring elements, that is, the first spring tongues 23a and the wire springs 24, have been employed for urging the tape cassette towards the bottom walls of the holder arms 11 and 12 and for urging the tape cassette towards the holder base 10, respectively. However, a single spring element may be employed for both of these purposes. This can be accomplished by utilizing the first spring tongues 23a each having a free end so bent as to engage the cassette guide 22 so as to urge the tape cassette towards the bottom walls of the holder arms 11 and 12 and, at the same time, the tape cassette towards the holder base 10.

Accordingly, such changes and modifications are to be understood as included within the scope of the present invention as defined by the appended claims, unless they depart therefrom.

What is claimed is:

1. A cassette tape player having a cassette chamber defined therein adapted to be selectively opened and closed, the cassette tape player comprising:

a lid hingedly supported on the cassette tape player on a lid hinge axis about which said lid pivots between an open position and a closed position;

a cassette holder movable between a loading position and an operative position about a holder hinge axis that is parallel to said lid hinge axis, said cassette holder comprising an elongated holder base and holder arms rigidly connected at first ends thereof to respective opposite ends of said holder base, said holder arms having a space therebetween, and said elongated holder base and said holder arms defining a cassette receiving chamber;

a cassette guide movably secured to a portion of said lid that is located opposite to said lid hinge axis for pivotal movement between retracted and protruding positions about a guide hinge axis parallel to said holder hinge axis, said cassette guide being operable to guide a tape cassette into the cassette receiving chamber so that opposite side portions of a tape cassette are slidingly received by said holder arms when said lid is in said open position thereof; and said cassette guide comprises guide arms spaced from each other a distance corresponding to the space between said holder arms, said guide arms forming respective guide slopes sloping to said cassette receiving chamber when said cassette guide is in said protruding position.

2. The cassette tape player of claim 1, wherein said cassette guide is biased to said protruding position by a biasing element when said lid is in said open position thereof.

3. The cassette tape player of claim 2, wherein said cassette guide is moved against the force of said biasing element to said retracted position when said lid is in said closed position thereof.

4. The cassette tape player of claim 2, wherein said holder arms have free second ends remote from said first ends, said lid has a front edge at said portion of said lid that is located opposite to said lid hinge axis and said guide slopes of said guide arms of said cassette guide extend between said front edge of said lid and free second ends of said holder arms.

5. The cassette tape player of claim 1, wherein said holder arms have free second ends remote from said first ends, said lid has a front edge at said portion of said lid that is located opposite to said lid hinge axis and said guide slopes of said guide arms of said cassette guide extend between said front edge of said lid and said free second ends of said holder arms.

6. The cassette tape player of claim 1, and further comprising a biasing means for applying a resilient force to said cassette guide for urging said cassette guide toward said protruding position and toward a tape cassette for retaining the tape cassette in position when the tape cassette is in said cassette chamber when said lid is pivoted to said closed position, wherein said cassette guide is forcibly moved against said biasing means when said lid is pivoted to said closed position, wherein said cassette receiving chamber has a tape cassette insertion direction, and wherein said guide arms of said cassette guide comprise respective transverse walls extending in a direction parallel to said guide hinge axis so as to be engageable with a rear side edge of the tape cassette with respect to the direction of insertion when the tape cassette is inserted into the cassette receiving chamber in the direction of insertion in order to urge the tape cassette in a direction towards said holder base when said lid is moved to said closed position and said cassette holder is moved to said operative position.

7. The cassette tape player of claim 6, wherein said transverse walls have respective inclined ribs thereon that are slidingly engageable with portions of the rear side edge of the tape cassette when the tape cassette is inserted into said cassette receiving chamber and said lid is closed and said cassette holder is moved to said operative position.

8. The cassette tape player of claim 7, wherein said guide arms have respective side walls thereon spaced apart a distance corresponding to the width of a tape cassette for regulating the lateral motion of the tape cassette when the tape cassette is inserted into said tape cassette receiving chamber.

9. The cassette tape player of claim 6, wherein said guide arms have respective side walls thereon spaced apart a distance corresponding to the width of a tape cassette for regulating the lateral motion of the tape cassette when the tape cassette is inserted into said tape cassette receiving chamber.

10. The cassette tape player of claim 1, wherein said guide arms have respective side walls thereon spaced apart a distance corresponding to the width of a tape cassette for regulating the lateral motion of the tape cassette when the tape cassette is inserted into said tape cassette receiving chamber.

11. A cassette tape player operable with either one of first and second types of cassettes, wherein each type of cassette accommodates therein a reeled magnetic recording tape, the first type of cassette has a uniform thickness, a head access window and at least one roller access window defined at a front thereof, and a normally closed slide shutter for selectively opening and closing both the head and roller access windows, and the second type of cassette has a head access window, at least one roller access window defined at a bulged area at a front portion, and maximum and minimum thicknesses, the bulged area defining the maximum thickness, said cassette tape player comprising:

a lid for selectively opening and closing a cassette chamber in said cassette tape player, said lid being hingedly supported on the cassette tape player on a lid hinge axis about which said lid pivots between an open position and a closed position;

a cassette holder movable between a loading position and an operative position about a holder hinge axis that is parallel to said lid hinge axis, said cassette holder comprising an elongated holder base and holder arms rigidly connected at first ends thereof to respective opposite ends of said holder base, said holder arms having a space therebetween, and said elongated holder base and said holder arms defining a cassette receiving chamber;

a cassette guide movably secured to a portion of said lid that is located opposite to said lid hinge axis for pivotal movement between retracted and protruding positions about a guide hinge axis parallel to said holder hinge axis, said cassette guide being operable to guide either one of the first and second types of tape cassette into the cassette receiving chamber so that opposite side portions of the tape cassette are slidingly received by said holder arms when said lid is in said open position thereof;

said cassette guide comprises guide arms spaced from each other a distance corresponding to the space between said holder arms, said guide arms forming respective guide slopes sloping to said cassette receiving chamber when said cassette guide is in said protruding position; and a shutter actuating means for actuating and opening the slide shutter of the first type of cassette only when the first type of cassette is inserted into said cassette receiving chamber, said shutter actuating means being carried by said holder base for movement between erected and retracted positions, wherein said shutter actuating means is pivoted to said folded position in response to the insertion of the first type of cassette to thereby open the slide shutter and pivoted to said retracted position in response to insertion of the second type of cassette.

12. The cassette tape player of claim 11, and further comprising:

a first spring means that is operable only when the second type of cassette is inserted into said cassette receiving chamber for engaging the bulged area of the second type of tape cassette when said cassette holder having the second type of tape cassette therein is moved to said operative position thereof upon said lid being moved to said closed position thereof and retaining the second type of tape cassette in position within said cassette chamber; and a second spring means operable only when the first type of cassette is inserted into said cassette receiving chamber for engaging the first type of tape cassette when said cassette holder having the first type of tape cassette therein is moved to said operative position thereof upon said lid being moved to said closed position thereof and retaining the first type of tape cassette in position within said cassette chamber.

13. The tape cassette player of claim 12, and further comprising a means for regulating the amount of pivotal movement of said cassette holder relative to said lid.

14. The cassette tape player of claim 13, wherein said guide arms have respective side walls thereon spaced apart a distance corresponding to the width of a tape cassette for regulating the lateral motion of the tape cassette when the tape cassette is inserted into said tape cassette receiving chamber.

15. The tape cassette player of claim 12, and further comprising a biasing means for applying a resilient force to said cassette guide for urging said cassette guide toward said protruding position and toward a tape cassette for retaining the tape cassette in position when the tape cassette is in said cassette chamber when said lid is pivoted to said closed position, wherein said cassette guide is forcibly moved against said biasing means when said lid is pivoted to said closed position, wherein said cassette receiving chamber has a tape cassette insertion direction, and wherein said guide arms of said cassette guide comprise respective transverse walls extending in a direction parallel to said guide hinge axis so as to be engageable with a rear side edge of the tape cassette with respect to the direction of insertion when the tape cassette is inserted into the cassette receiving chamber in the direction of insertion in order to urge the tape cassette in a direction towards said holder base when said lid is moved to said closed position and said cassette holder is moved to said operative position.

16. The cassette tape player of claim 15, wherein said transverse walls have respective inclined ribs thereon that are slidingly engageable with portions of the rear side edge of the tape cassette when the tape cassette is inserted into said cassette receiving chamber and said lid is closed and said cassette holder is moved to said operative position.

17. The cassette tape player of claim 16, wherein said guide arms have respective side walls thereon spaced apart a distance corresponding to the width of a tape cassette for regulating the lateral motion of the tape cassette when the tape cassette is inserted into said tape cassette receiving chamber.

18. The cassette tape player of claim 15, wherein said guide arms have respective side walls thereon spaced apart a distance corresponding to the width of a tape cassette for regulating the lateral motion of the tape cassette when the tape cassette is inserted into said tape cassette receiving chamber.

19. The cassette tape player of claim 12, wherein said guide arms have respective side walls thereon spaced apart a distance corresponding to the width of a tape cassette for regulating the lateral motion of the tape cassette when the tape cassette is inserted into said tape cassette receiving chamber.

20. The cassette tape player of claim 11, wherein said cassette guide is biased to said protruding position by a biasing element when said lid is in said open position thereof, wherein said cassette guide is moved against the force of said biasing element to said retracted position when said lid is in said closed position thereof, and wherein said holder arms have free second ends remote from said first ends, said lid has a front edge at said portion of said lid that is located opposite to said lid hinge axis and said guide slopes of said guide arms of said cassette guide extend between said front edge of said lid and said free second ends of said holder arms.

21. A cassette tape player operable with a tape cassette accommodating therein a reeled magnetic recording tape, the tape cassette having a uniform thickness, a head access window and at least one roller access window defined at a front thereof, and a normally closed slide shutter for selectively opening and closing both the head and roller access windows, said cassette tape player comprising:

a lid for selectively opening and closing a cassette chamber in said cassette tape player, said lid being hingedly supported on the cassette tape player on a lid hinge axis about which said lid pivots between an open position and a closed position;

a cassette holder movable between a loading position and an operative position about a holder hinge axis that is parallel to said lid hinge axis, said cassette holder comprising an elongated holder base and holder arms rigidly connected at first ends thereof to respective opposite ends of said holder base, said holder arms having a space therebetween, and said elongated holder base and said holder arms defining a cassette receiving chamber;

a cassette guide movably secured to a portion of said lid that is located opposite to said lid hinge axis for pivotal movement between retracted and protruding positions about a guide hinge axis parallel to said holder hinge axis, said cassette guide being operable to guide either one of the first and second types of tape cassette into the cassette receiving chamber so that opposite side portions of the tape cassette are slidingly received by said holder arms when said lid is in said open position thereof;

a biasing means for applying a resilient force to said cassette guide for urging said cassette guide toward said protruding position and toward a tape cassette for retaining the tape cassette in position when the tape cassette is in said cassette chamber when said lid is pivoted to said closed position, wherein said cassette guide is forcibly moved against said biasing means when said lid is pivoted to said closed position;

said cassette guide comprises guide arms spaced from each other a distance corresponding to the space between said holder arms, said guide arms forming respective guide slopes sloping to said cassette receiving chamber when said lid is in said open position and said cassette guide is in said protruding position;

wherein said cassette receiving chamber has a tape cassette insertion direction, and wherein said guide arms of said cassette guide comprise respective transverse walls extending in a direction parallel to said guide hinge axis so as to be engageable with a rear side edge of the tape cassette with respect to the direction of insertion when the tape cassette is inserted into the cassette receiving chamber in the direction of insertion in order to urge the tape cassette in a direction towards said holder base when said lid is moved to said closed position and said cassette holder is moved to said operative position; and a shutter actuating means carried by said holder base for movement between erected and folded positions for opening the slide shutter of the tape of cassette when the tape cassette is inserted into said cassette receiving chamber, said shutter actuating means being pivoted to said folded position in response to the insertion of the first type of cassette to thereby open the slide shutter.

22. The cassette tape player of claim 21, wherein said holder arms have free second ends remote from said first ends, said lid has a front edge at said portion of said lid that is located opposite to said lid hinge axis and said guide slopes of said guide arms of said cassette guide extend between said front edge of said lid and said free second ends of said holder arms.

* * * * *